(12) United States Patent
Moriya

(10) Patent No.: US 7,691,654 B2
(45) Date of Patent: Apr. 6, 2010

(54) METHOD FOR MANUFACTURING ACTIVE MATRIX SUBSTRATE, ACTIVE MATRIX SUBSTRATE, ELECTRO-OPTICAL DEVICE AND ELECTRONIC APPARATUS

(75) Inventor: Katsuyuki Moriya, Azumino (JP)

(73) Assignee: Seiko Epson Corporation (JP)

( * ) Notice: Subject to any disclaimer, the term of this patent is extended or adjusted under 35 U.S.C. 154(b) by 765 days.

(21) Appl. No.: 11/347,687

(22) Filed: Feb. 3, 2006

(65) Prior Publication Data

US 2006/0176413 A1  Aug. 10, 2006

(30) Foreign Application Priority Data

Feb. 4, 2005 (JP) ............... 2005-028587

(51) Int. Cl.
*H01L 21/00* (2006.01)

(52) U.S. Cl. ............... 438/34; 438/151; 438/479; 438/493

(58) Field of Classification Search ............ 438/34, 438/151, 479, 493
See application file for complete search history.

(56) References Cited

U.S. PATENT DOCUMENTS

| 6,838,361 | B2 | 1/2005 | Takeo |
| 6,933,988 | B2 | 8/2005 | Ohgami et al. |
| 7,192,859 | B2 | 3/2007 | Yamazaki et al. |
| 7,199,033 | B2 | 4/2007 | Hirai et al. |
| 2006/0286704 | A1 | 12/2006 | Hirai |
| 2007/0178687 | A1 | 8/2007 | Yamazaki et al. |

FOREIGN PATENT DOCUMENTS

| CN | 1462484 | 12/2003 |
| CN | 1574207 A | 2/2005 |
| JP | 04-280231 | 10/1992 |
| JP | 09-171974 | 6/1997 |
| JP | 10-048651 | 2/1998 |
| JP | 2002-268084 | 9/2002 |
| JP | 2003-208111 | 7/2003 |
| JP | 2005-005694 | 1/2005 |
| JP | 2005-013985 | 1/2005 |
| KR | 2004-103316 | 12/2004 |

OTHER PUBLICATIONS

Communication from Korean Patent Office regarding counterpart application.

*Primary Examiner*—Fernando L Toledo
(74) *Attorney, Agent, or Firm*—Harness, Dickey & Pierce, P.L.C.

(57) ABSTRACT

A method for manufacturing an active matrix substrate having a pixel electrode including: forming a bank partitioning the pixel electrode by a droplet discharge method; and disposing a functional liquid containing a conductive material to a region partitioned by the bank so as to form the pixel electrode.

10 Claims, 17 Drawing Sheets

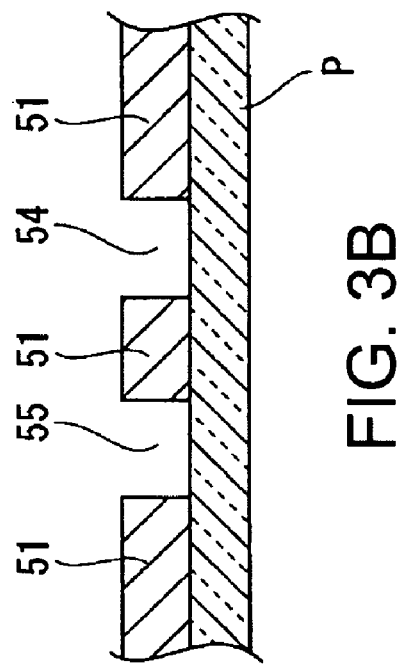
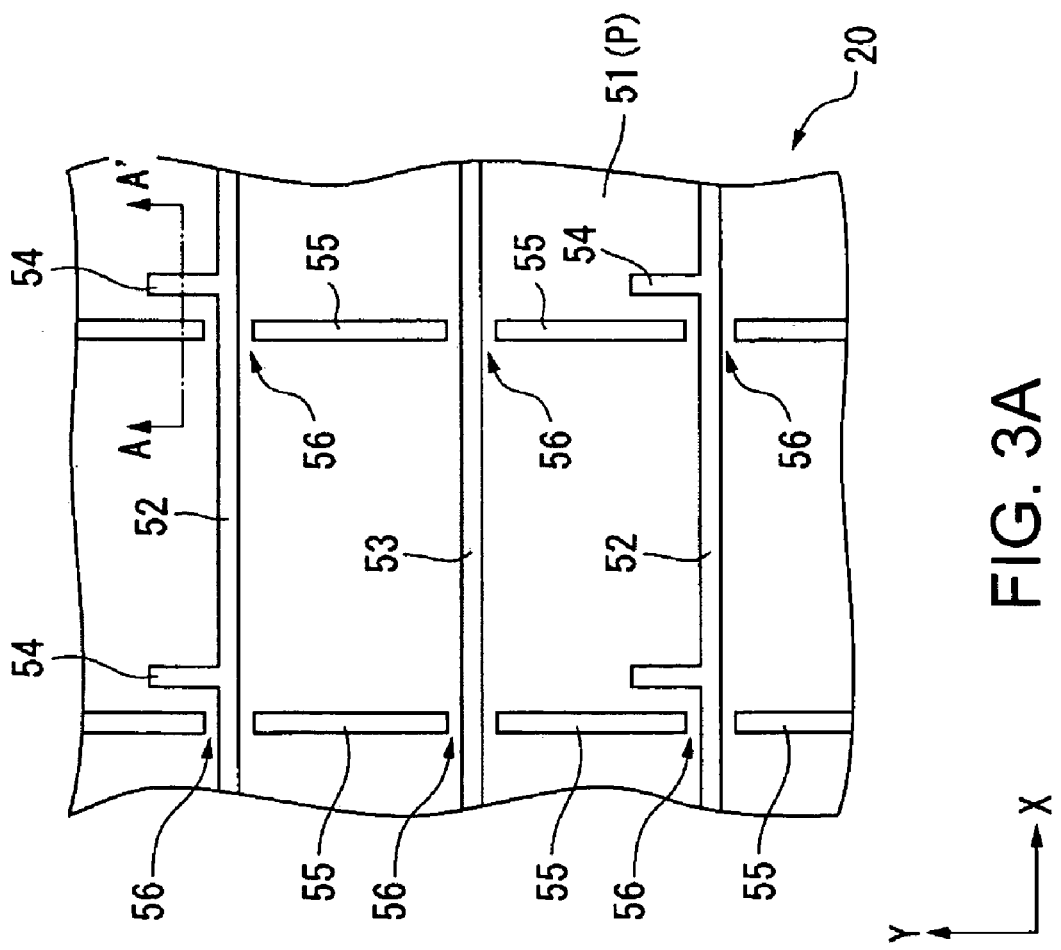
FIG. 3B
FIG. 3A

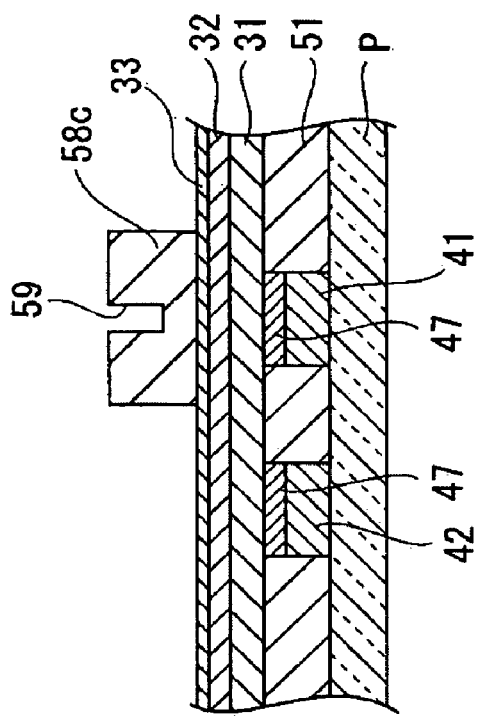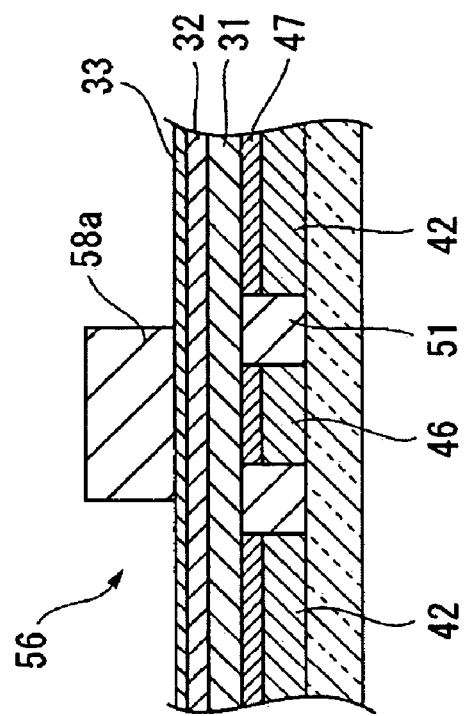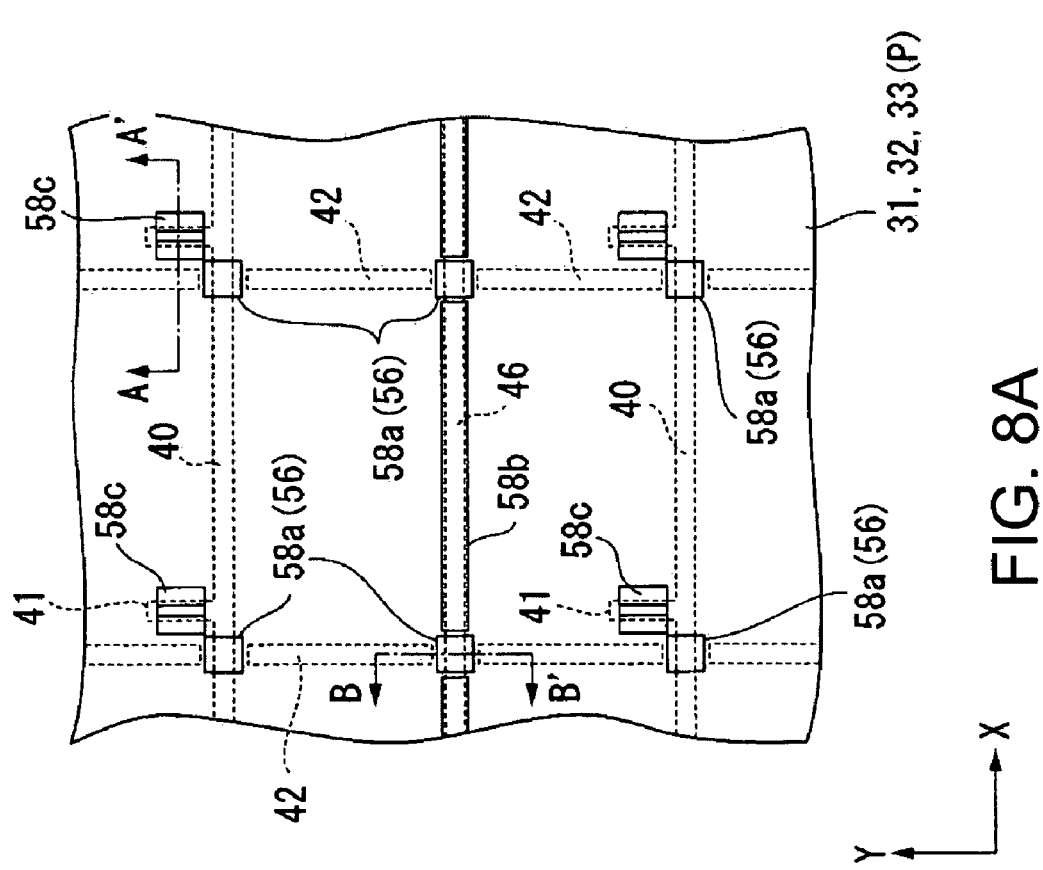

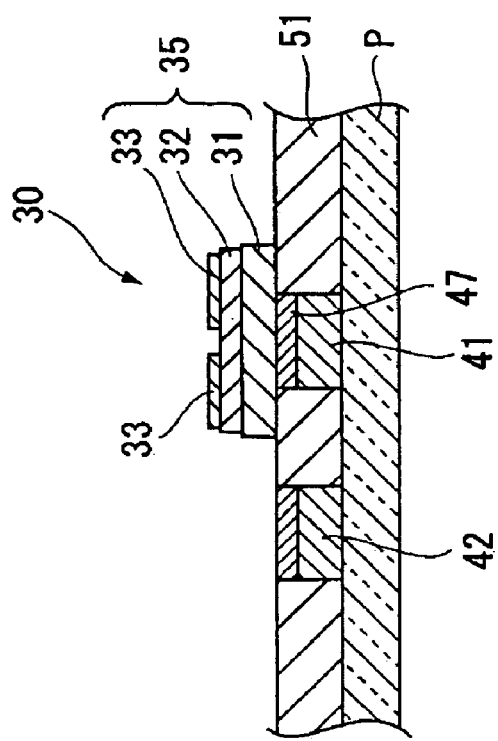
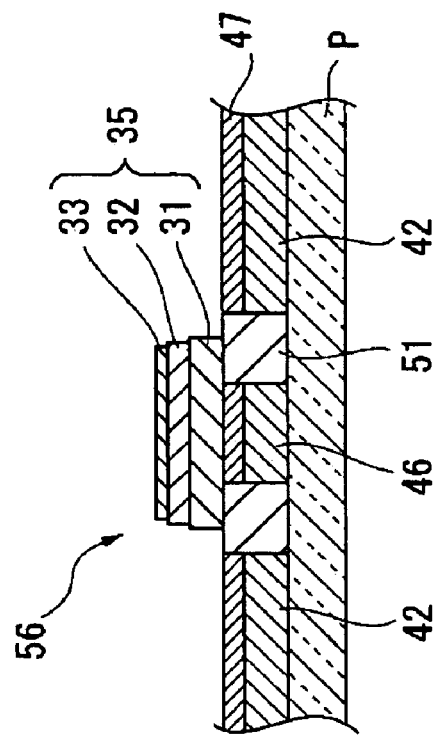
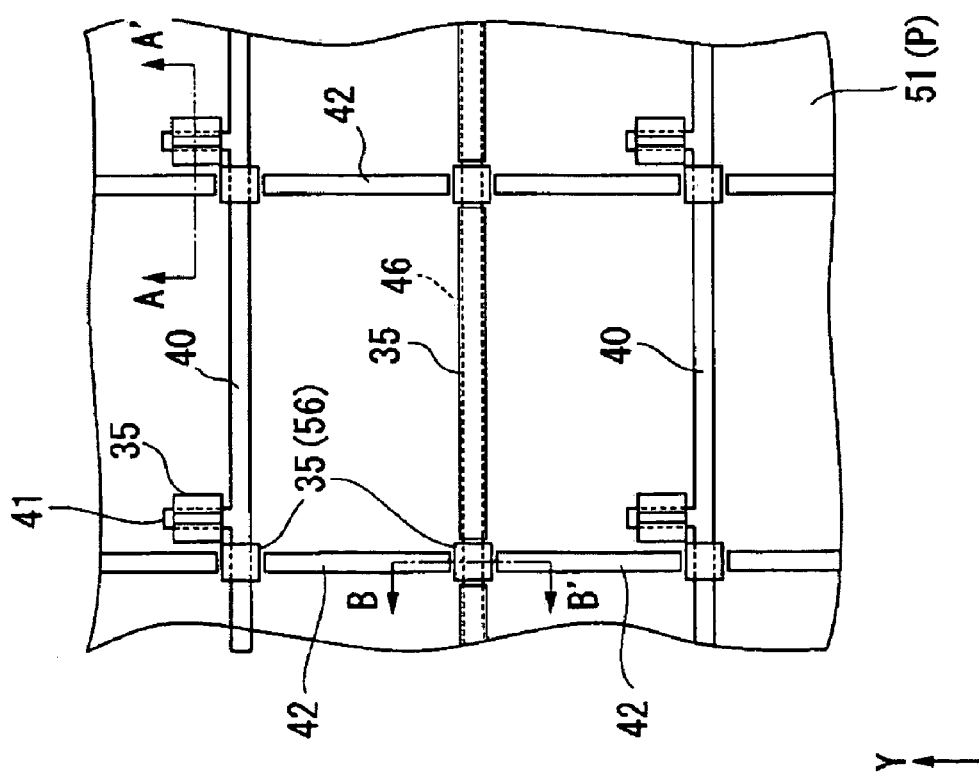
FIG. 9A
FIG. 9B
FIG. 9C

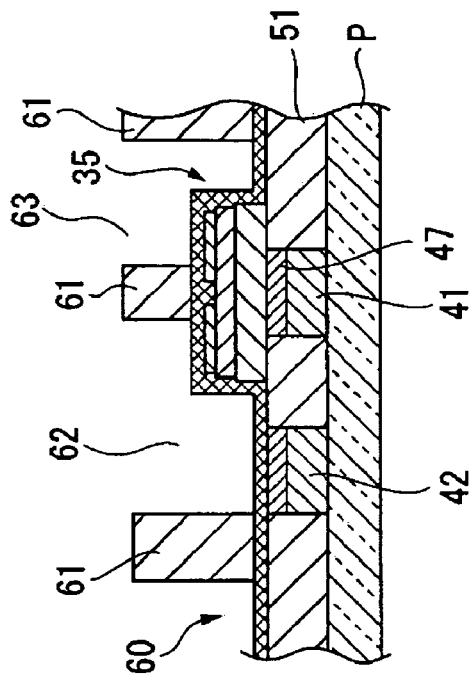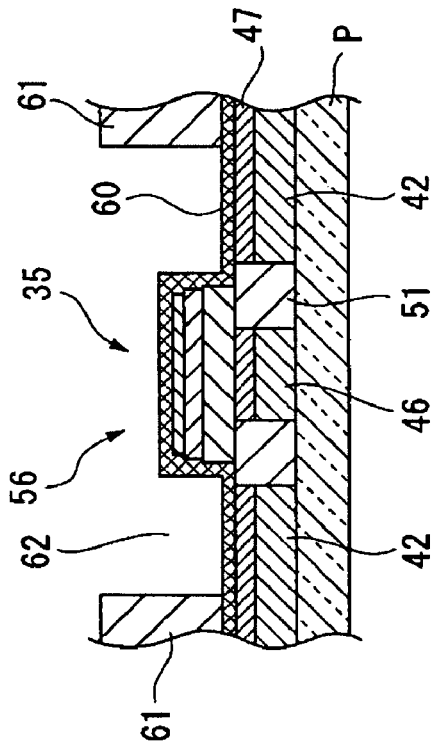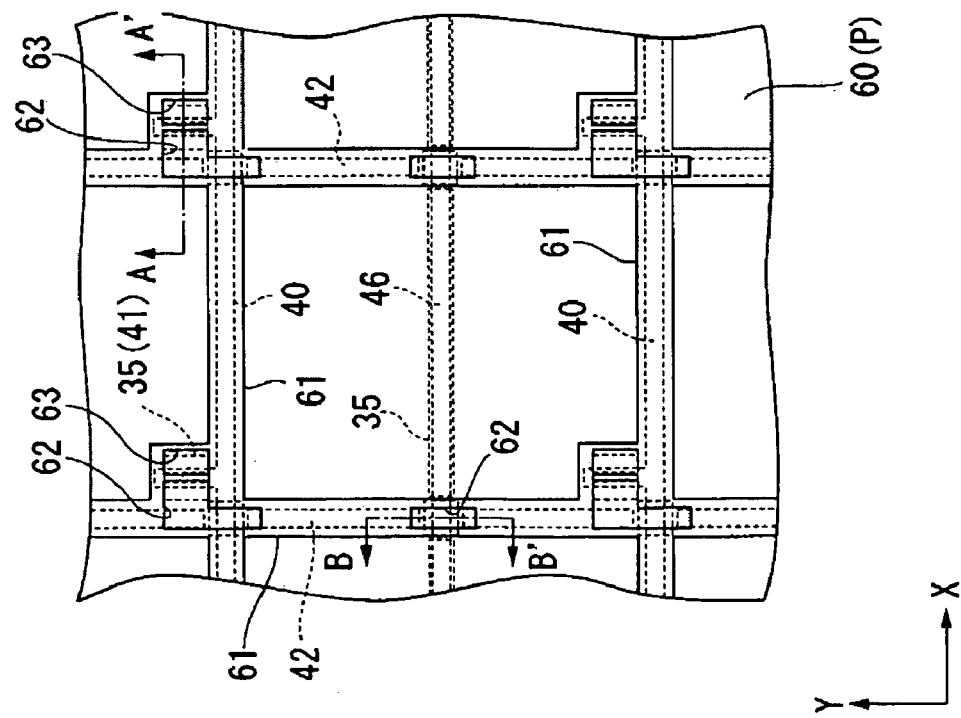

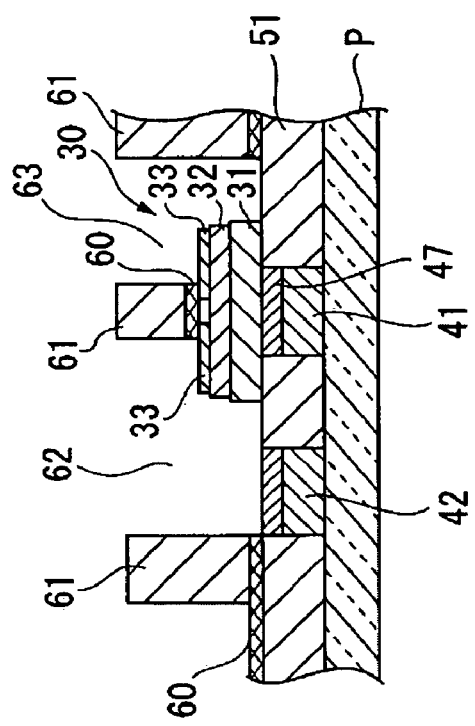
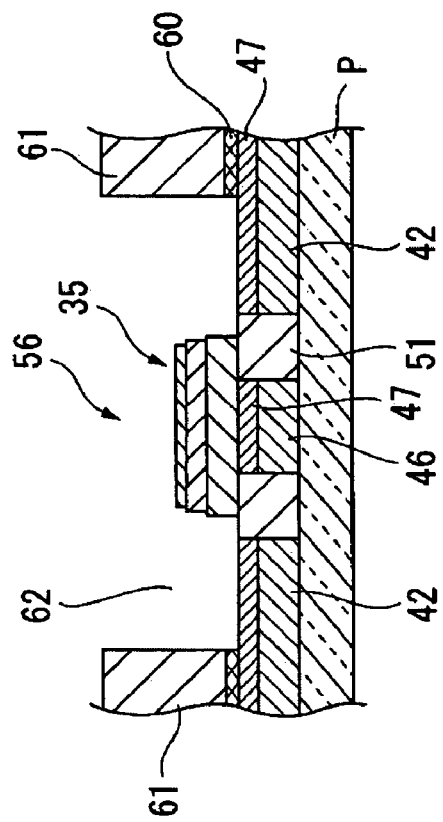
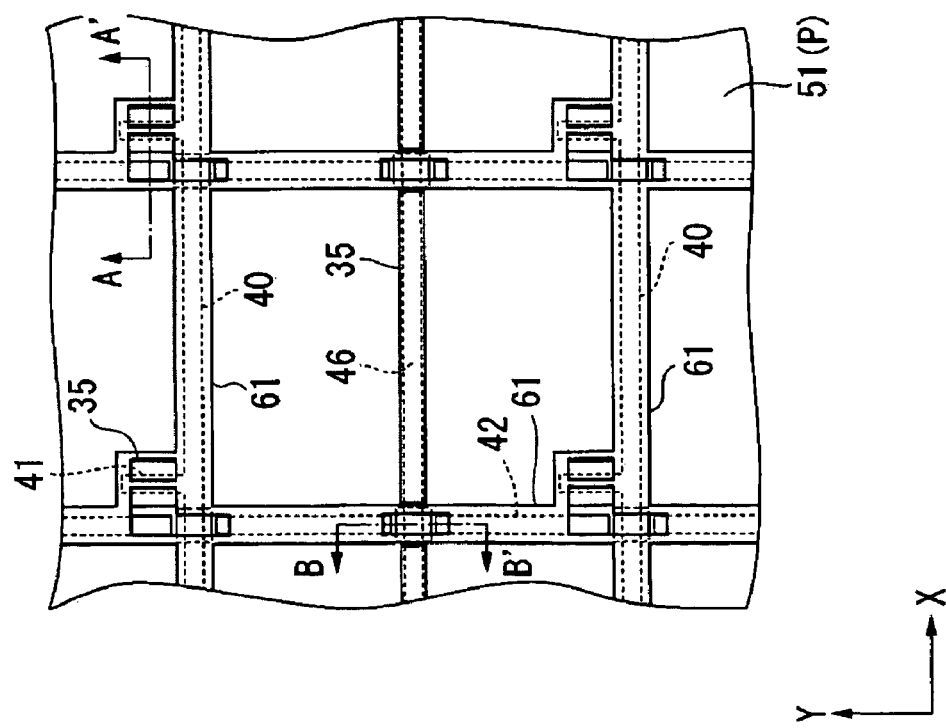
FIG.12B
FIG.12C
FIG.12A

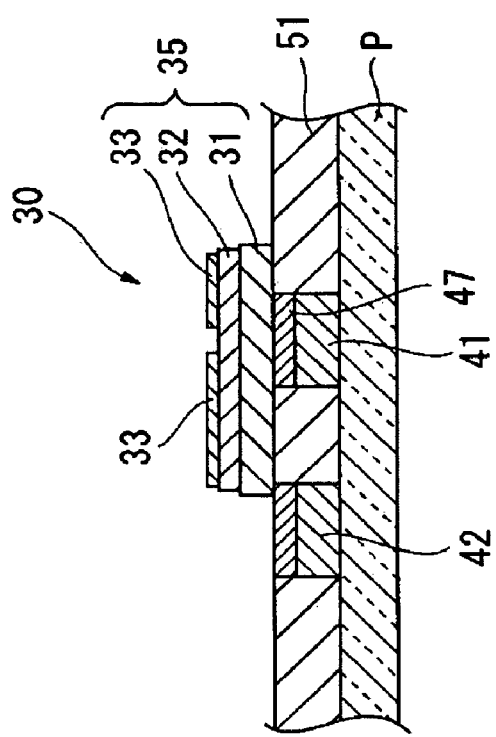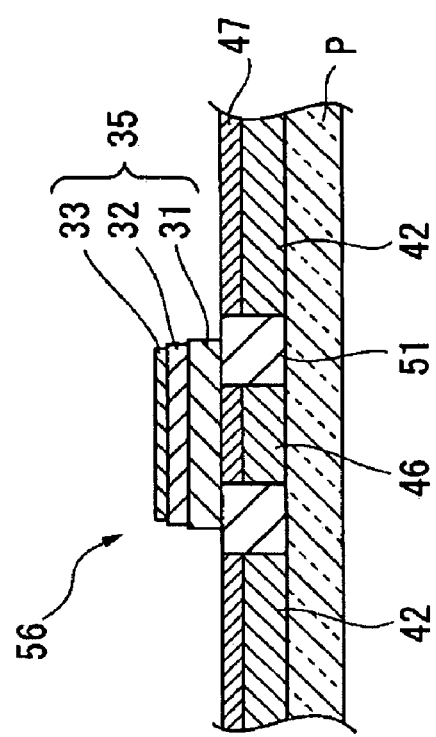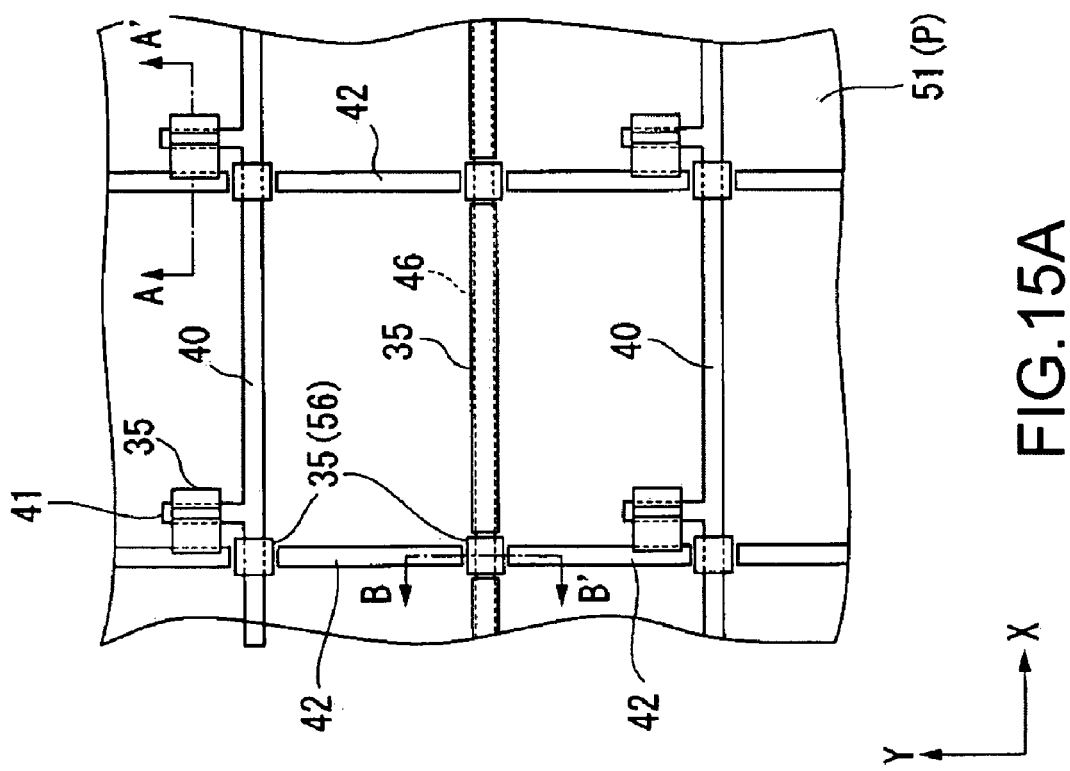

METHOD FOR MANUFACTURING ACTIVE MATRIX SUBSTRATE, ACTIVE MATRIX SUBSTRATE, ELECTRO-OPTICAL DEVICE AND ELECTRONIC APPARATUS

BACKGROUND

1. Technical Field

The present invention relates to a method for manufacturing an active matrix substrate, an active matrix substrate, an electro-optical device, and an electronic apparatus.

2. Related Art

Along with the popularization of mobile devices such as notebook personal computers, cellular phones, thin-and-light liquid display devices are widely used. This type of liquid crystal display device has a structure in which a liquid crystal layer is sandwiched between an upper substrate and a lower substrate.

An example of the lower substrate (active matrix substrate) is shown in FIG. 19. As shown in FIG. 19, a lower substrate 30 is structured by including a glass substrate P, a gate scan electrode 11 and a source electrode 17 both of which are wired on the glass substrate P so as to be intersected with each other, a drain electrode 14 wired on the glass substrate P, a pixel electrode (ITO) 19 connected to the drain electrode 14, an insulation layer 28 provided between the gate scan electrode 11 and the source electrode 17, and a thin film transistor (TFT) 63 composed of a thin film semiconductor. For forming various metal wirings in the lower substrate 30, a method is employed as exemplified in JP-A-9-171974. In the method, a process is repeated many times in which dry processes and photolithography are combined.

The technique, however, has a drawback in that material costs and administrative costs increase, while a yield rate is hardly increased since the process is carried out many times in which dry processes and photolithographic etching processes are combined. Specifically, the wiring pattern of a thin film is formed by the following manners: a photosensitive material called a resist is coated on a substrate on which a conductive film has been coated in advance; a circuit pattern is irradiated and developed; and the conductive film is etched corresponding to a resist pattern so as to form the wiring pattern. The technique also requires large-scale equipment such as vacuum apparatuses, and has material use efficiency of a few percents, thereby resulting in almost all material being discarded. As a result, it leads to high manufacturing costs. Therefore, reducing the number of processes in which dry processes and photolithographic etching processes are combined is a major issue for liquid crystal display devices required to match the trend lines of lower product costs.

SUMMARY

An advantage of the invention is to provide a method for manufacturing an active matrix substrate that can reduce the number of processes in which dry processes and photolithographic etching processes are combined.

In order to achieve the advantage, a method for manufacturing an active matrix substrate having a pixel electrode according to a first aspect of the invention includes forming a bank partitioning the pixel electrode by a droplet discharge method and disposing a functional liquid containing a conductive material to a region partitioned by the bank so as to form the pixel electrode.

According to the method, the number of required photo processes can be reduced from four processes (a gate wiring forming process, a TFT element forming process, a source wiring forming process, and a pixel electrode forming process) in a conventional way to three processes (the gate wiring forming process, TFT element forming process, and source wiring forming process).

A method for manufacturing an active matrix substrate according to a second aspect of the invention includes: a first process to form a wiring on a substrate in a lattice-shaped pattern, wherein the wiring includes: a first direction wiring; and a second direction wiring, wherein one of the first wiring and the second wiring is divided at an intersection of the first direction wiring and the second direction wiring; a second process to form a multilayered part composed of an insulation film and a semiconductor film on the intersection and on a part of the wiring; and a third process to form a conductive layer on the multilayered part so as to electrically link the divided wirings, and a pixel electrode electrically connected to the wiring via the semiconductor film, wherein the process to form the conductive layer and the pixel electrode include: a process to form a bank partitioning the conductive layer and the pixel electrode by a droplet discharge method; and a process to dispose a functional liquid containing a conductive material to a region partitioned by the bank.

According to the method, the number of required photo processes, which are only the first and second processes in this case, can be reduced in half as compared with the conventional way.

In the method, the wiring includes a source wiring, a gate wiring, and a capacitance wiring extending almost straight along the gate wiring, the source wiring being divided at the intersection.

According to the method, these wirings can be formed on the same plane at one time since they are prevented from being touched by each other.

In the method, the wiring can be formed by a droplet discharge method.

According to the method, the number of photo processes can be further reduced.

In the method, the second process can include a process to form the multilayered part on the capacitance wiring, the multilayered part being divided at the intersection.

According to the method, a current flowed in the conductive layer formed on the multilayered part formed on the intersection can be prevented from being flowed into the multilayered part formed on the capacitance wiring since the multilayered part formed on the capacitance wiring and the multilayered part formed on the intersection are not touched.

In the method, the second process can include a process to perform a half exposure process to the semiconductor film so as to form a switching element.

According to the method, the switching element can easily be formed.

In the method, the bank can be formed with a material having lyophobicity.

According to the method, no process is required to make the bank surface lyophobic since the bank has the lyophobicity. As a result, processes can be simplified.

In the method, the material can contain an inorganic material.

According to the method, the bank has high heat resistance and a small difference in a thermal expansion coefficient from that of the substrate since the material forming the bank contains the inorganic material. Therefore, the deterioration of the bank due to heat when drying the functional liquid is suppressed. As a result, a film pattern can be formed in a good shape.

An active matrix substrate according to a third aspect of the invention is manufactured by using the method for manufacturing an active matrix substrate according to the first aspect of the invention.

In this case, an active matrix substrate can be achieved with low costs.

An electro-optical device according to a fourth aspect of the invention is equipped with the active matrix substrate according to the first and second aspects of the invention. An electronic apparatus according to a fifth aspect of the invention is equipped with the electro-optical device according to the fourth aspect of the invention.

In this case, the electro-optical device and electronic apparatus can be achieved with low costs since the low cost active matrix substrate can be used.

BRIEF DESCRIPTION OF THE DRAWINGS

The invention will be described with reference to the accompanying drawings, wherein like numbers refer to like elements, and wherein:

FIG. 3 is a diagram illustrating a procedure of manufacturing the active matrix substrate.

FIG. 8 is a diagram illustrating a procedure following FIG. 7.

FIG. 9 is a diagram illustrating a procedure following FIG. 8.

FIG. 11 is a diagram illustrating a procedure following FIG. 10.

FIG. 12 is a diagram illustrating a procedure following FIG. 11.

FIG. 15 is a schematic diagram illustrating an active matrix substrate according to another embodiment of the invention.

DESCRIPTION OF EXEMPLARY EMBODIMENTS

Hereinafter, a method for manufacturing an active matrix substrate, an active matrix substrate, an electro-optical device, and an electronic apparatus according to an embodiment of the invention will be described with reference to the accompanying drawings.

Active Matrix Substrate

Figure 1:
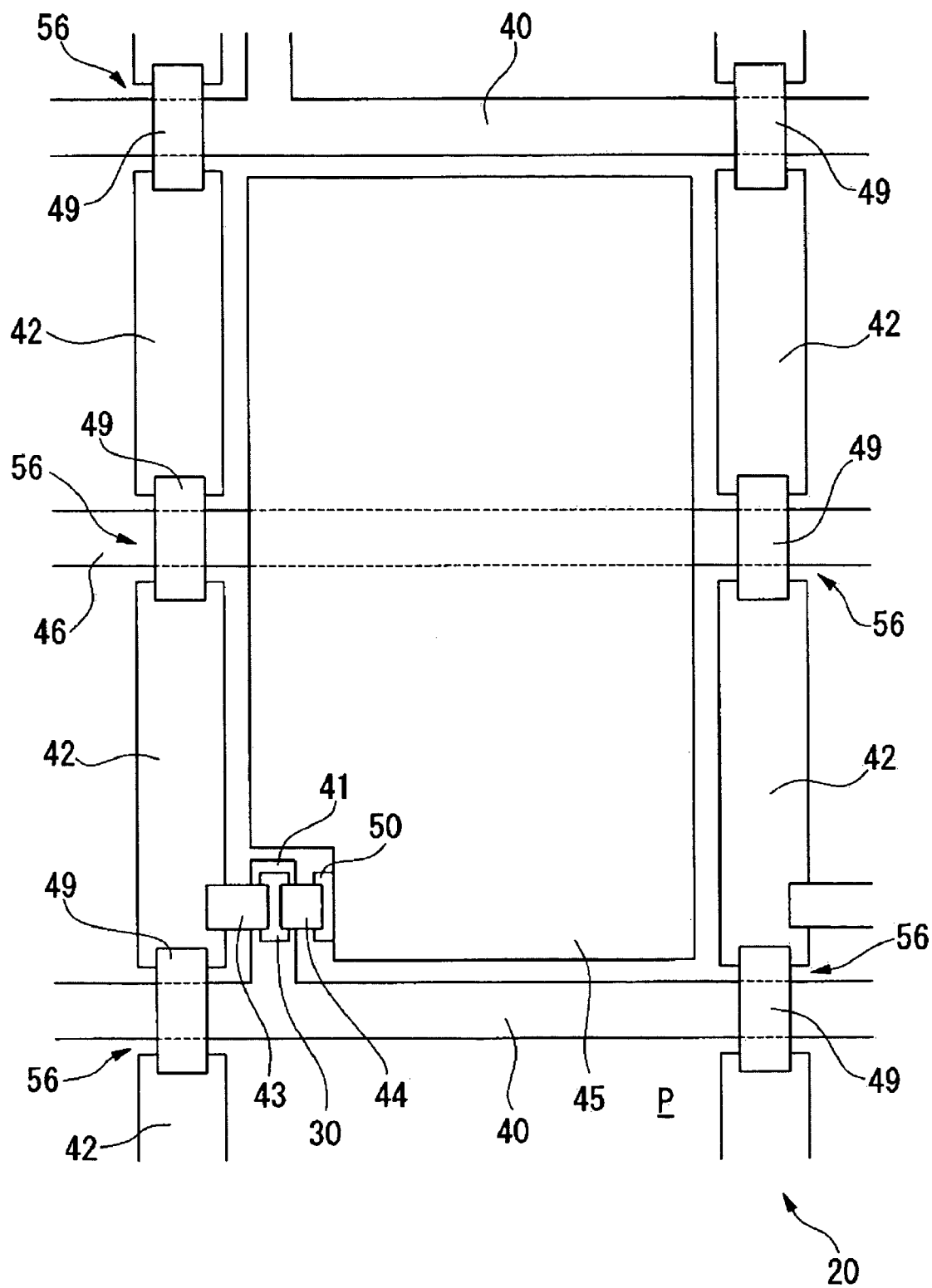
FIG. 1 is a partially enlarged view illustrating an active matrix substrate.

FIG. 1 is a partially enlarged view illustrating a part of the active matrix substrate according to an embodiment of the invention.

A gate wiring 40 and a source wiring 42 are wired so as to be arranged in a lattice shape on an active matrix substrate 20. That is, a plurality of gate wirings 40 is formed so as to be extended in the X direction (a first direction), while a plurality of source wirings 42 is formed so as to be extended in the Y direction (a second direction).

A gate electrode 41, on which a TFT 30 is disposed via an insulation layer, is connected to the gate wiring 40. In contrast, a source electrode 43, one end of which is connected to the TFT (switching element) 30, is connected to the source wiring 42.

A pixel electrode 45, which is connected to the TFT 30 via the drain electrode 44, is disposed in a region surrounded with the gate wiring 40 and source wiring 42.

In addition, a capacitance wiring 46 is wired on the active matrix substrate 20 so as to be almost in parallel with the gate wiring 40. The capacitance wiring 46 is disposed under the pixel electrode 45 and source wiring 42 via an insulation layer.

Here, the gate wiring 40, gate electrode 41, source wiring 42, and capacitance wiring 46 are formed on the same plane.

Figure 2:
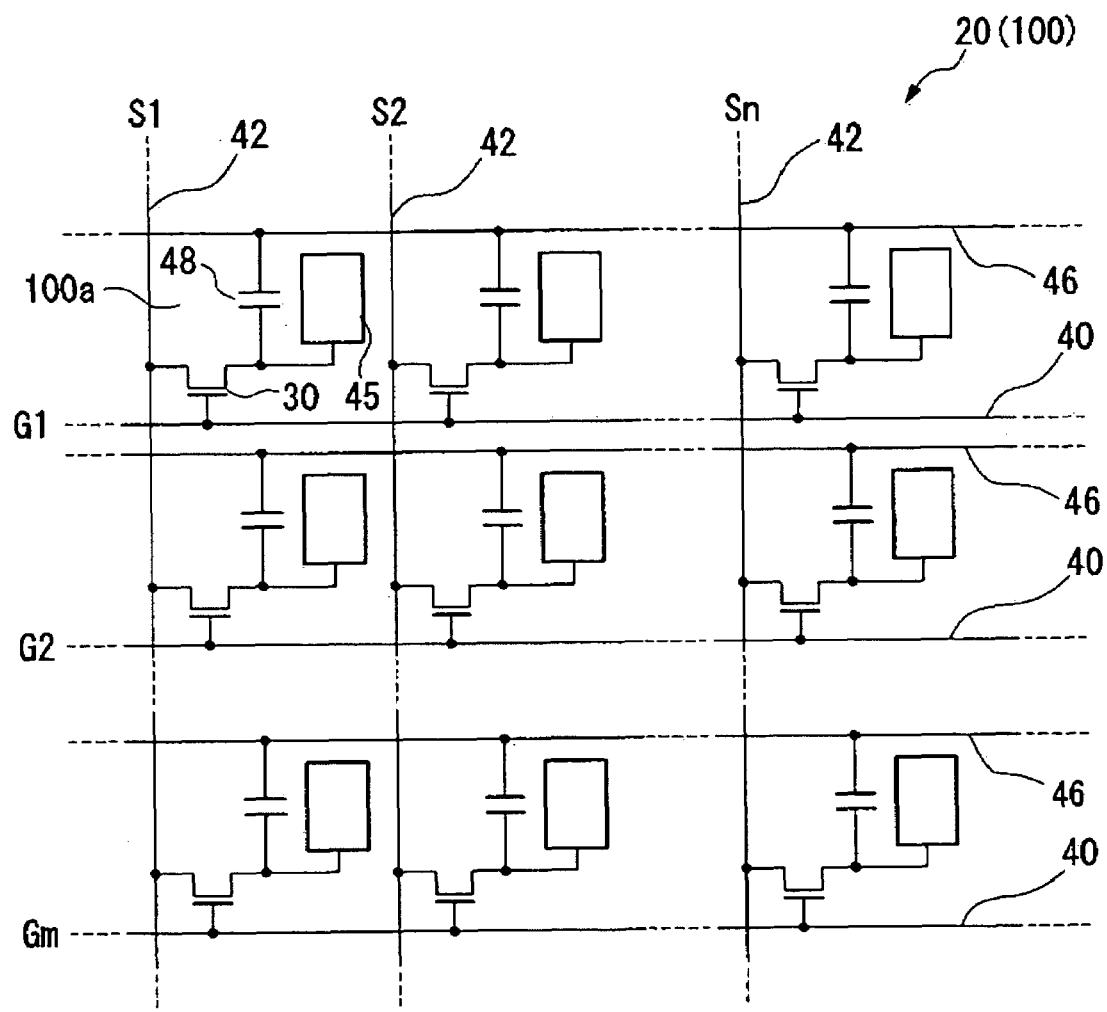
FIG. 2 is an equivalent circuit diagram of the active matrix substrate.

FIG. 2 is an equivalent circuit diagram of the active matrix substrate 20 when it is used for a liquid crystal display device.

When the active matrix substrate 20 is used for the liquid crystal display device, a plurality of pixels 100a is disposed in a matrix in an image display region. In each of the plurality of pixels 100a, the TFT 30 for switching a pixel is formed. Each source wiring 42, which supplies respective pixel signals S1, S2, . . . , Sn, is electrically connected to the source of each TFT 30 via each source electrode 43. The pixel signals S1, S2, . . . Sn, may be supplied in line-sequentially in this order, or may be supplied to every group of the source wirings 42 adjacent to each other and composed of one or more thereof.

In contrast, the gate wiring 40 is electrically connected to the gate of the TFT 30 via the gate electrode 41. Scan signals G1, G2, . . . , Gn are pulsatively applied to respective gate wirings 40 in line-sequentially in this order with a predetermined timing.

The pixel electrode 45 is electrically connected to the drain of the TFT via the drain electrode 44. Accordingly, the pixel signals S1, S2, . . . Sn, which are supplied from the source wirings 42, are written into respective pixels with a predetermined timing during a fixed period in which the TFT 30 serving as the switching element is kept an on state. As a result, the pixel signals S1, S2, . . . , Sn, which are written into a liquid crystal at a predetermined level via the pixel electrodes 45 are kept between a counter electrode 121 of a counter substrate 120 shown in FIG. 17 and the pixel electrodes 45 for a fixed period.

In this regard, a storage capacitance 48 is added by the capacitance wirings 46 in parallel with a liquid crystal capacitance formed between the pixel electrode 45 and the counter electrode 121 in order to prevent the pixel signals S1, S2, . . . , Sn from being leaked. For example, the voltage of the pixel electrode 45 is kept by the storage capacitor 48 for a time period three digits longer than that during which the source voltage is applied. Accordingly, electron storage characteristic is improved. As a result, a liquid crystal display device 100 having a high contrast ratio can be achieved.

Method for Manufacturing an Active Matrix Substrate

Next, the method for manufacturing the active matrix substrate 20 will be described.

The active matrix substrate 20 is manufactured by the following three processes: a first process in which a wiring is formed on a substrate P in a lattice pattern; a second process in which a multilayered part 35 is formed; and a third process in which the pixel electrode 45, etc., are formed. In the embodiment, a method for forming a film pattern according to the invention is applied to the processes forming the source electrode 43, drain electrode 44, and pixel electrode 45.

Each process will be described in detail below.

First Process; Wiring Formation

Figure 4B:
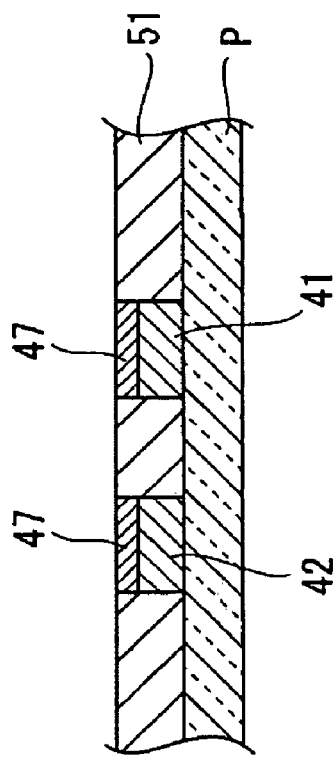
FIG. 4 is a diagram illustrating a procedure following FIG. 3.
Figure 4A:
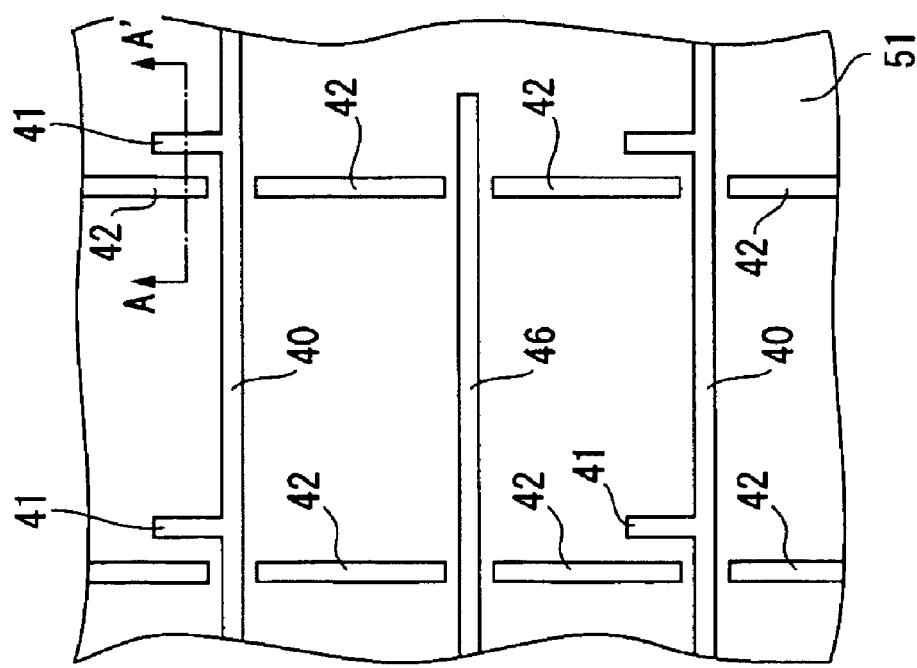

FIG. 3 and FIG. 4 are explanatory drawings illustrating a wiring formation process as the first process. Here, FIG. 3B and FIG. 4B are respectively show a cross-sectional view taken along A-A' line in FIG. 3A and FIG. 4A.

As the substrate P on which the gate wiring 40, source wiring 42, and the like are formed in a lattice-shaped pattern, various materials can be used such as glass, quartz glass, a silicon (Si) wafer, a plastic film, a metal plate. In addition, the various materials on each surface of which a semiconductor film, a metal film, a dielectric film, or an organic film is further formed as an underlayer, are also included.

First, a bank 51 made of an insulation material is formed on the substrate P as shown in FIG. 3. The bank functions for disposing wiring ink, which will be described later, at a predetermined position of the substrate P.

Specifically, the bank 51 is formed on the upper surface of the cleaned substrate P by a photolithography method as shown in FIG. 3A. The bank 51 includes a plurality of openings 52, 53, 54, and 55 that correspond to the forming position of wirings formed in the lattice-shaped pattern.

As the material for the bank 51, a polymer material is used such as acrylic resin, polyimide resin, olefin resin, or melamine resin. In addition, inorganic materials can also be included in the material for the bank 51 taking heat resisting properties or the like into consideration. Examples of the inorganic materials for the bank include: an inorganic polymer material and a photosensitive inorganic material both include silicon in its skeleton such as polysilazane, polysiloxane, siloxane based resist, and polysilane based resist; a spin-on-glass film including any of silica glass, alkylsiloxane polymer, alkylsilsesquioxane polymer, alkylsilsesquioxanehydride polymer, and polyarylether; a diamond film; and fluorinated amorphous carbon film. Further, for example, aero-gel, porous silica, or the like may be used as the inorganic material for bank. A photosensitive material such as a photosensitive polysilazane composition, which includes polysilazane and a photoacid generator, is preferably employed since no resist mask is required. Here, lyophobic treatment is performed to the bank 51 in order to adequately dispose the wiring pattern ink inside the openings 52, 53, 54, and 55. As the lyophobic treatment, $CF_4$ plasma treatment (plasma treatment using gas containing a fluorine component) or the like is performed. In this regard, a lyophobic component (fluorine group, or the like) may be charged into the raw material of the bank 51 in advance instead of performing the $CF_4$ plasma treatment.

The openings 52, 53, 54, and 55 that are partitioned by the bank 51 correspond to the wirings formed in the lattice-shaped pattern composed of such as the gate wiring 40 and source wiring 42. That is, the wiring ink is disposed in the openings 52, 53, 54, and 55 of the bank 51 so as to form the wirings in the lattice-shaped pattern composed of such as the gate wiring 40, source wiring 42 and so forth.

Specifically, the openings 52 and 53, which are formed so as to be extended in the X direction, respectively correspond to the position for forming the gate wiring 40 and the position for forming the capacitance wiring 46. In addition, the opening 54 corresponding to the position for forming the gate electrode 41 is connected to the opening 52 corresponding to the position for forming the gate wiring 40. Moreover, the opening 55 formed so as to be extended in the Y direction corresponds to the position for forming the source wiring 42. Here, the opening 55 extending in the Y direction is formed so as to be divided at an intersection 56 so that the opening 55 does not cross the openings 52 and 53 both of which extend in the X direction.

Then, wiring ink containing a conductive fine particle is discharged and disposed in the openings 52, 53, 54 and 55 by a droplet discharge device IJ, which will be described later. The resulting ink forms wirings on the substrate in the lattice-shaped pattern composed of such as the gate wirings 40, source wirings 42 and so forth.

The wiring ink is composed of a dispersion liquid in which the conductive fine particle is dispersed into a dispersion medium, or a solution in which an organic silver compound or a nanosized particle of silver oxide is dispersed into a solvent (dispersion medium). As the conductive fine particle, for example, a metal fine particle including gold, silver, cupper, tin, lead, and their oxides, and a fine particle of a conductive polymer or a super-conductive material or the like are used. These conductive fine particles may be used by coating organic matter on their surfaces in order to improve dispersion property.

The conductive fine particle preferably has a diameter of not less than 1 nm nor more than 0.1 μm. If more than 0.1 μm, the nozzle of a droplet discharge head described later may be clogged. In contrast, if less than 1 nm, the volume ratio of the coating material to the conductive fine particle becomes large. As a result, the organic matter occupies excess parts in the resulting film.

Any dispersion medium capable of dispersing the above-described conductive particles and does not cause an aggregation can be used. For example, other than water, alcohols such as methanol, ethanol, propanol, butanol, or the like, a hydro-carbon compounds such as n-heptane, n-octane, decane, dodecane, tetradecane, toluene, xylene, cymene, durene, indene, dipentene, tetrahydronaphthalene, decahydronaphthalene, cyclohexylbenzene or the like, an ether compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, 1,2-dimethoxyethane, bis (2-methoxyethyl) ether, p-dioxane, or the like, and a polar compounds such as propylene carbonate, gamma-butyrolactone, N-methyl-2-pyrrolidone, dimethylformamide, dimethyl sulfoxide, cyclohexanone, or the like are exemplified. Water, the alcohols, the carbon hydride series compounds, and the ether series compounds are preferable for the dispersion medium, water and the carbon hydride series compounds are much preferred from the following points of view: a dispersion of the fine particles, a stability of the dispersion, and an ease of the application for the droplet discharge method (inkjet method).

It is preferable that a surface tension of the dispersion liquid of the conductive fine particle is, for example, within a range of 0.02 N/m to 0.07 N/m. If the surface tension is below 0.02 N/m when the liquid is discharged using the inkjet method, the wettability of the ink composition with respect to a discharge nozzle surface is increased, rendering it likely to cause a flight curve, while if the surface tension exceeds 0.07 N/m the meniscus shape at the tip of the nozzle is unstable, rendering the control of the discharge amount and discharge timing problematic. In order to adjust the surface tension, it is advisable to add a surface tension regulator of a fluorine based, silicone based, nonionic based, or the like, to the dispersion liquid, in a minute amount within the range in which the contact angle with respect to the substrate is not unduly lowered. The nonionic surface tension regulator enhances the wettability of a liquid with respect to a substrate, improves the leveling property of a film, and serves to prevent minute concavities and convexity of a film from being made. The surface tension regulators may include an organic compound such as alcohol, ether, ester, and ketone, if necessary.

The viscosity of the dispersion liquid is preferably not less than 1 mPa·s nor more than 50 mPa·s. When a liquid material is discharged by the inkjet method as a droplet, if the viscosity is below 1 mPa·s, the periphery part of the nozzle is easily contaminated due to the leakage of ink, while viscosity greater than 50 mPa·s results in the nozzle opening being clogged frequently, rendering the smooth discharge of the droplet difficult.

After discharging the wiring ink to the substrate P, drying or firing is carried out in order to remove the dispersion medium, if necessary.

The drying process can be carried out, for example, by using a typical hot plate or electric furnace for heating the substrate P. For example, the process is carried out at 180 degrees centigrade for about 60 minutes.

The process temperature of the firing process is adequately determined taking into account the boiling point (vapor pressure) of the dispersion medium, thermal behavior such as dispersibility or oxidizability of the fine particle, presence or absence of the coating material, quantity of the coating material, heat resistance temperature of a base material, or the like. For example, the firing process is required to carry out at about 250 degrees centigrade in order to remove the coating material containing organic matter.

The drying or firing process secures an electrical contact between the conductive fine particles. As a result, the discharged ink is converted into a conductive film.

A metal protective film 47 may be formed on the wirings such as gate wiring 40 or source wiring 42. The metal protective film 47 is a thin film for suppressing an electro migration phenomenon of the conductive film composed of silver, cupper, or the like. As the material forming the metal protective film 47, nickel is preferable. The metal protective film 47 composed of nickel is also disposed and formed on the substrate P by the droplet discharge method.

As a result, as shown in FIG. 4, a layer, which is composed of the bank 51 and the wirings formed in the lattice-shaped pattern, is formed on the substrate P by the processes described above.

Here, as discharge techniques of the droplet discharge method, a charge control method, a pressurized vibration method, an electromechanical converting method, an electrothermal converting method, an electrostatic attraction method, or the like are exemplified. In the charge control method, an electric charge is applied to a material by a charge electrode. The material is discharged from a nozzle by controlling a flying direction of the material with a deflection electrode. The pressurized vibration method is the method in which ultra-high pressure of approximately 30 kg/cm² is applied to a material so as to discharge the material at the tip of a nozzle. If no control voltage is applied, the material goes straight ahead so as to be discharged from the nozzle. If the control voltage is applied, electrostatic repelling occurs in the material so as to scatter the material, thereby resulting in no material being discharged from the nozzle. The electromechanical converting method is a method in which a characteristic of a piezo element (piezoelectric element) is utilized that the piezo element deforms in response to a pulsed electric signal. The deformation of the piezo element applies pressure, via an elastic material, to space storing a material so as to push the material out from the space to discharge it from the nozzle.

In the electrothermal converting method, a heater provided in space storing a material evaporates the material rapidly so as to produce bubbles, so that the material in the space is discharged by the pressure of the bubbles. In the electrostatic attraction method, micro pressure is applied to space storing a material so as to form a meniscus of the material at the nozzle. Then, electrostatic attraction is applied so as to pull out the material while the condition is kept. Techniques are applicable that includes a method utilizing a viscosity change of fluid with electric fields, and a method utilizing discharged sparks other than the methods described above. The droplet discharge method has an advantage in that a desired amount of a material can be adequately provided at a desired position with little waste in material usage. Here, the amount of one drop of a liquid material (fluid) discharged by the droplet discharge method is, for example, from 1 to 300 nanograms.

Figure 5:
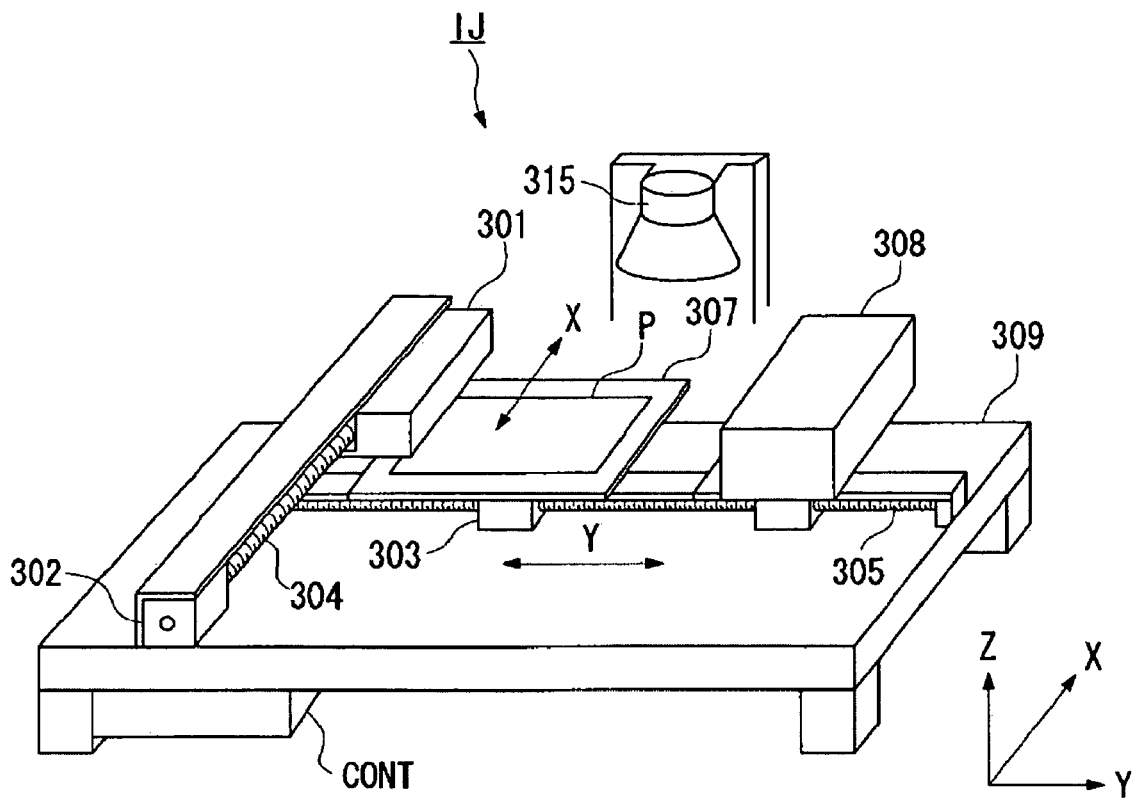
FIG. 5 is a schematic perspective view illustrating a droplet discharge device.

The droplet discharge device IJ shown in FIG. 5 is used, for example, as the droplet discharge device IJ used for forming the wiring formed in the lattice-shaped pattern.

The droplet discharge device (inkjet device) IJ, which discharges (drops) a droplet to the substrate P from a droplet discharge head, includes a droplet discharge head 301, an X direction drive axis 304, a Y direction guide axis 305, a controller CONT, a stage 307, a cleaning mechanism 308, a base 309, and a heater 315. The stage 307, which supports the substrate P to which ink (a liquid material) is provided by the droplet discharge device IJ, includes a fixing mechanism (not shown) for fixing the substrate P to a reference position.

The droplet discharge head 301 is a multi-nozzle type droplet discharge head equipped with a plurality of discharge nozzles. The longitudinal direction of the head 301 coincides with the Y-axis direction. The plurality of discharge nozzles is disposed on the lower surface of the droplet discharge head 301 in the Y-axis direction with a constant interval. The above-described ink containing the conductive fine particle is discharged from the discharge nozzles of the droplet discharge head 301 to the substrate P supported by the stage 307.

An X direction drive motor 302 is connected to the X direction drive axis 304. The X direction drive motor 302, which is a stepping motor or the like, rotates the X direction drive axis 304 when a driving signal for the X direction is supplied from the controller CONT. The X direction drive axis 304 rotates so as to move the droplet discharge head 301 in the X-axis direction.

The Y direction guide axis 305 is fixed so as not to move with respect to the base 309. The stage 307 is equipped with a Y direction drive motor 303. The Y direction drive motor 303, which is a stepping motor or the like, moves the stage 307 in the Y direction when a driving signal for the Y direction is supplied from the controller CONT.

The controller CONT supplies a voltage to the droplet discharge head 301 for controlling a droplet discharge. The controller CONT also supplies a drive pulse signal to the X direction drive motor 302 for controlling the droplet discharge head 301 in the X direction movement, and a drive pulse signal to the Y direction drive motor 303 for controlling the stage 307 in the Y direction movement.

The cleaning mechanism 308 cleans the droplet discharge head 301. The cleaning mechanism 308 is equipped with a drive motor (not shown) for the Y direction. Driving the Y direction drive motor moves the cleaning mechanism along the Y direction guide axis 305. The movement of the cleaning mechanism 308 is also controlled by the controller CONT.

The heater 315, which is means to subject the substrate P under heat treatment by a lump annealing, evaporates and dries a solvent contained in the liquid material applied on the substrate P. Turning on and off of the heater 315 are also controlled by the controller CONT.

The droplet discharge device IJ discharges a droplet to the substrate P while relatively scanning the droplet discharge head 301 and the stage 307 supporting the substrate P. Hereinafter, the X direction is referred to as a scan direction, while the Y direction perpendicular to the X direction is referred to as a non-scan direction.

Therefore, the plurality of discharge nozzles of the droplet discharge head 301 is disposed in the Y direction, which is the non-scan direction, with a constant interval. In FIG. 5, the droplet discharge head 301 is disposed at a right angle with respect to the traveling direction of the substrate P. However, the droplet discharge head 301 may be disposed so as to intersect with the traveling direction of the substrate P by adjusting its fixing angle. Accordingly, the pitch between the nozzles can be adjusted by adjusting the fixing angle of the droplet discharge head 301. In addition, the distance between the substrate P and the nozzle surface may be arbitrary adjusted.

Figure 6:
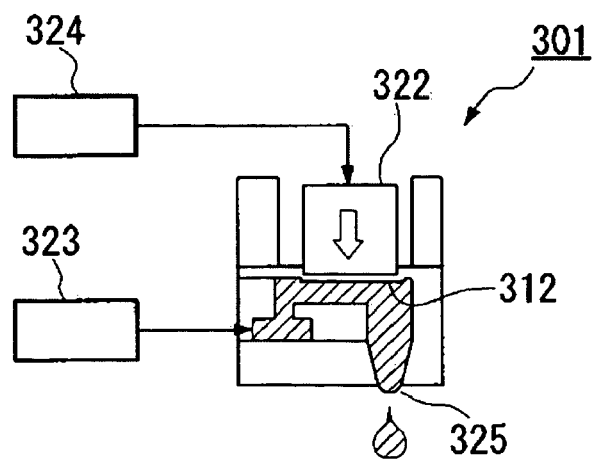
FIG. 6 is a cross-sectional view of a droplet discharge head.
Figure 7B:
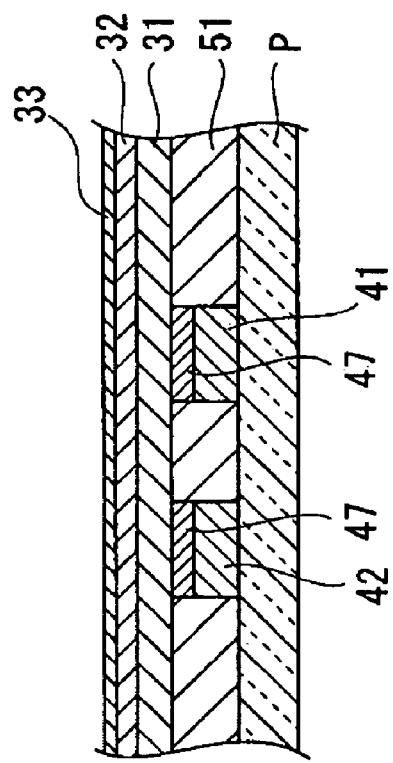
FIG. 7 is a diagram illustrating a procedure following FIG. 4.
Figure 7A:
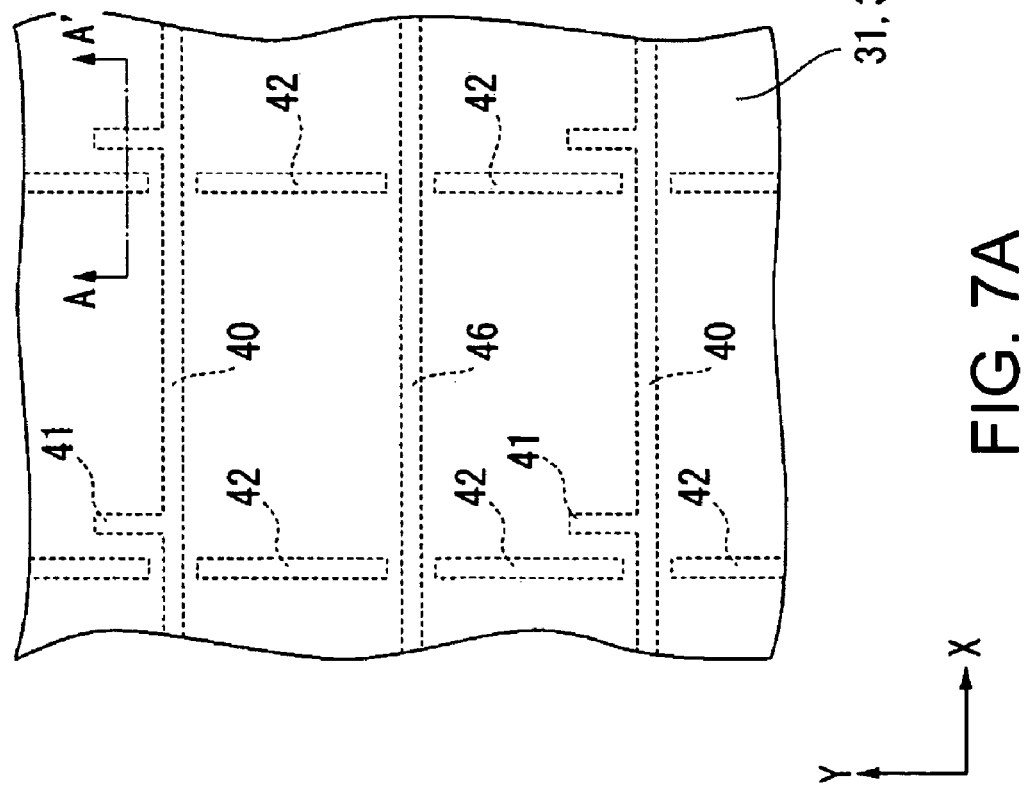
Figure 10B:
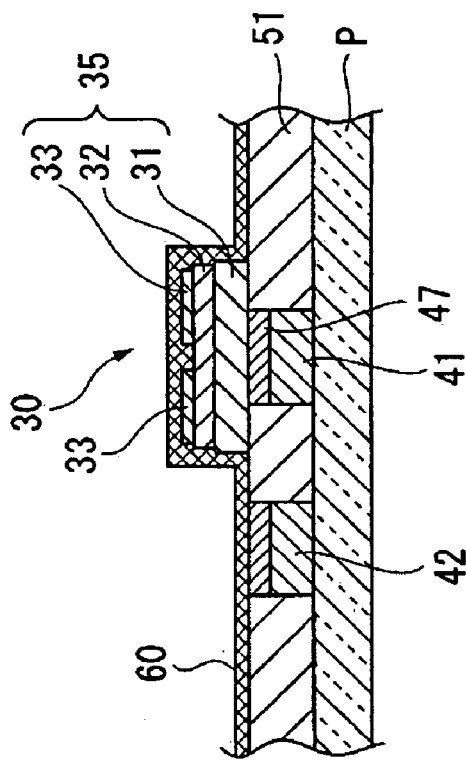
FIG. 10 is a diagram illustrating a procedure following FIG. 9.
Figure 10C:
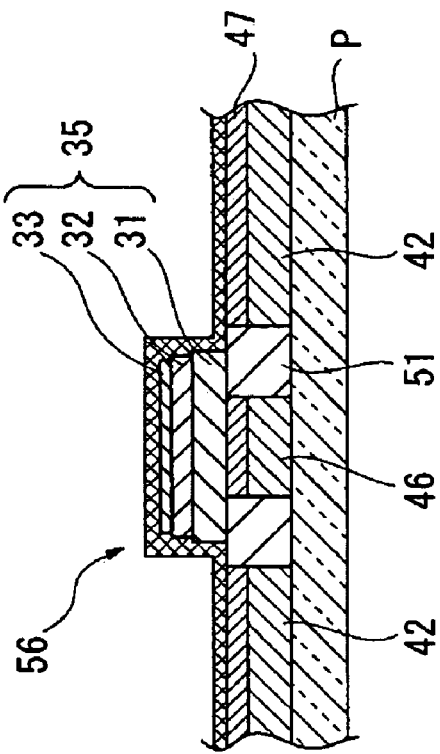
Figure 10A:
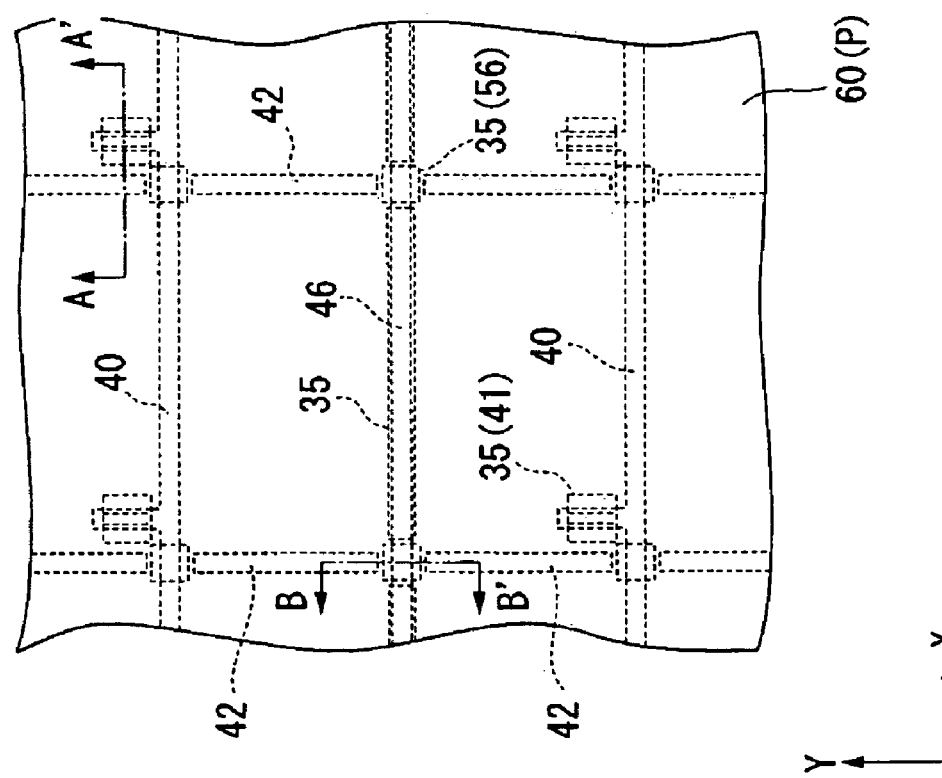

FIG. 6 is a cross-sectional view of the droplet discharge head 301.

In the droplet discharge head 301, a piezo element 322 is disposed adjacent to a liquid chamber 321 storing a liquid material (wiring ink or the like). The liquid material is supplied to the liquid chamber 321 through a liquid material supply system 323 including a material tank for storing the liquid material.

The piezo element 322 is connected to a driving circuit 324, via which a voltage is applied to the piezo element 322 so as to deform the piezo element 322. This deformation of the piezo element 322 deforms the liquid chamber 321, resulting in the liquid material being discharged from a nozzle 325.

In this case, a strain amount of the piezo element 322 is controlled by changing the value of the applied voltage. In addition, a strain velocity of the piezo element 322 is controlled by changing the frequency of the applied voltage. The droplet discharge by the piezo method has an advantage in that few influences are given to a composition of a material since no heat is applied to the material.

Second Process; Multilayered Part Formation

FIG. 7 through FIG. 10 are explanatory drawings illustrating a multilayered part formation process as the second process. Here, FIG. 7B through FIG. 10B are respectively show a cross-sectional view taken along A-A' line in FIG. 7A and FIG. 10A, while FIG. 8C through FIG. 10C are respectively show a cross-sectional view taken along B-B' line in FIG. 8A and FIG. 10A.

In the second process, the multilayered part 35 composed of an insulation film 31 and a semiconductor film (a contact layer 33 and an active layer 32) is formed at a predetermined position on the layer composed of the bank 51 and the wiring formed in the lattice-shaped pattern.

First, the insulation film 31, active layer 32, and contact layer 33 are sequentially formed on the entire surface of the substrate P by a plasma CVD method. Specifically, as shown in FIG. 7, a silicon nitride film as the insulation film 31, an amorphous silicon film as the active layer 32, and an n$^+$ type silicon film as the contact layer 33 are sequentially formed by changing raw material gas or plasma conditions.

Then, as shown in FIG. 8, a resist 58 (58a to 58c) is disposed by using the photolithography method on predetermined positions i.e. on an intersection 56 of the gate wiring 40 and source wiring 42, on the gate electrode 41, and on the capacitance wiring 46 as shown in FIG. 8A.

In this regard, the resist 58a disposed on the intersection 56 and the resist 58b disposed on the capacitance wiring 46 are formed so as not to contact each other. In addition, a groove 59 is formed on the resist 58c disposed on the gate electrode 41 by performing a half exposure as shown in FIG. 8B.

Then, the whole surface of the substrate P is subjected to an etching process so as to remove the contact layer 33 and active layer 32. The etching process is additionally carried out to remove the insulation film 31.

As a result, as shown in FIG. 9, the contact layer 33, active layer 32, and insulation layer 31 are removed from a region excluding the predetermined positions on which the resist 58 (58a to 58c) is disposed. In contrast, the multilayered part 35 composed of the insulation film 31 and the semiconductor film (the contact layer 33 and active layer 32) is formed on the predetermined positions on which the resist 58 is disposed.

In the multilayered part 35 formed on the gate electrode 41, the groove 59, which is formed by performing the half exposure to the resist 58c, runs through by performing an additional development before performing the etching process. Accordingly, as shown in FIG. 9B, the contact layer 33 corresponding to the groove 59 is removed, resulting in two separated parts being formed. As a result, the TFT 30 is formed on the gate electrode 41 as a switching element composed of the active layer 32 and contact layer 33.

Next, as shown in FIG. 10, a silicon nitride film is formed on the entire surface of the substrate P as a protective film 60 for protecting the contact layer 33.

As a result, the multilayered part 35 is completely formed.

Third Process

FIG. 11 through FIG. 14 are explanatory drawings illustrating a formation process of the pixel electrode 45 and the like as the third process. Here, FIG. 11B through FIG. 14B are respectively show a cross-sectional view taken along A-A' line in FIG. 11A and FIG. 14A, while FIG. 11C through FIG. 14C are respectively show a cross-sectional view taken along B-B' line in FIG. 11A and FIG. 14A.

In the third process, the source electrode 43, drain electrode 44, pixel electrode 45 and a conductive layer 49 are formed.

The source electrode 43, drain electrode 44, conductive layer 49 can be formed by using the same material used for forming the gate wiring 40 or source wiring 42. The pixel electrode 45, which requires transparency, is preferably formed with a transparent material such as indium tin oxide (ITO). The droplet discharge method is also used for forming them in the same way as in the first process.

First, a bank 61 is formed so as to cover the gate wiring 40, source wiring 42, and the like. The bank 61 is formed by the droplet discharge method. That is, bank forming ink (functional liquid) containing a bank forming material is directly discharged and disposed on the substrate P by the droplet discharge device IJ. Then, the resulting ink is subjected to the drying and firing processes so as to be the bank 61. As a result, as shown in FIG. 11, the bank 61 is formed in an almost lattice-shaped. An opening 62 is formed on the intersection of the source wiring 42 and gate wiring 40 as well as on the intersection of the source wiring 42 and capacitance wiring 46. An opening 63 is formed on the position corresponding to the drain region of the TFT 30.

In addition, the openings 62 and 63 are formed so that the multilayered part 35 (TFT 30) formed on the gate electrode 41 is partially exposed as shown in FIG. 11B. That is, the multilayered part 35 (TFT 30) is exposed in two parts divided by the bank 61 in the X direction.

Since the bank 61 is drawn by the discharged ink and depends on the diameter of landed ink, the resulting pattern is rougher than that achieved by using the photo process (e.g. the bank 51 for forming the gate wiring). However, in a case where the pixel electrode 45, source electrode 43, or drain electrode 44 is formed, they can be drawn with the width nearly same as the diameter of landed ink (a width of 20 μm to 30 μm) since the case is not required a fine structure such as needed for forming the gate wiring 40. In this regard, if the width of the bank 61 becomes too much wider, causing a drawback in an aperture ratio. Thus, it is preferable that the bank forming ink is used that has a large contact angle with respect to the substrate serving as the underlayer for the ink. Moreover, the bank is preferably formed with an inorganic material such as polysilazane in order to enhance heat resistance and transparency.

As the material for the bank 61, a polymer material is used such as acrylic resin, polyimide resin, olefin resin, or melamine resin in the same way as in the bank 51. In this case, a lyophobic component (fluorine group or the like) is preferably charged into the raw material. Accordingly, the bank 61 formed with the material having lyophobicity requires no post handling to make the bank 61 lyophobic. Particularly, in a case where a plurality of wiring layers is formed such as the active matrix substrate of the embodiment, if the CF4 plasma treatment or the like is performed on the entire surface of the substrate for making the bank lyophobic, which possibly results in an uneven film being formed. Because, not only the bank surface but also the surface of a part exposed between the banks (region partitioned by the bank) are made lyophobic, causing poor wettability when ink is discharged, depending on underlayer materials Alternatively, forming the bank with the material having lyophobicity eliminates such problem, enabling a good uniformed film to be formed without depending on the conditions of underlayers.

The opening 62 partitioned by the bank 61 corresponds to the position for forming the conductive layer 49 linking the source wirings 42 divided as well as the position for forming the source electrode 43. The opening 63 corresponds to the position for forming the drain electrode 44. The region surrounded by the bank 61 excluding the parts described above corresponds to the position for forming the pixel electrode 45. That is, the protective film 60 is opened by using the bank 61. Then, the conductive material is disposed in the openings 62, and 63 as well as the opening corresponding to the region surrounded by the bank 61, resulting in the conductive layer 49 linking the source wirings 42 divided, source electrode 43, drain electrode 44, and pixel electrode 45 being formed.

Subsequently, as shown in FIG. 12, the protective film 60 located in the openings 62 and 63 is removed by laser or the like so as to expose the contact layer 33. The metal protective film 47 formed on the wiring formed in the lattice-shaped pattern is also removed.

Next, electrode ink containing an electrode material for the source electrode 43, drain electrode 44, or the like is discharged and disposed in the openings 62 and 63 by the droplet discharge device IJ. As the electrode ink, one can be used that is the same as the wiring ink used for forming the gate wiring 40 or the like. After discharging the electrode ink to the substrate P, drying or firing process is carried out in order to remove the dispersion medium, if necessary. The drying or firing process secures an electrical contact between the conductive fine particles. As a result, the discharged ink is converted into a conductive film.

Figure 13B:
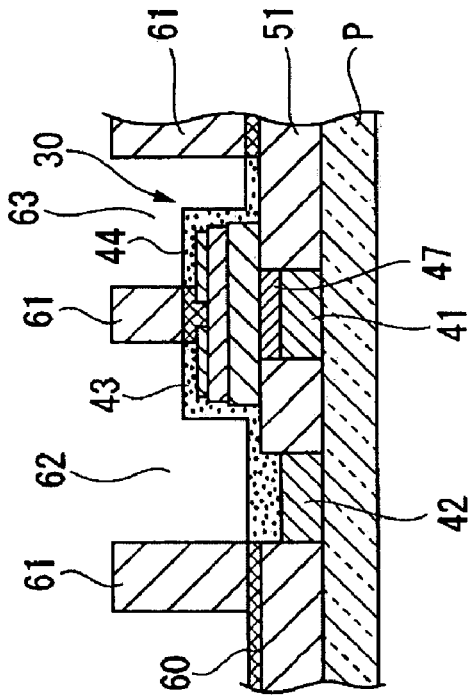
FIG. 13 is a diagram illustrating a procedure following FIG. 12.
Figure 13C:
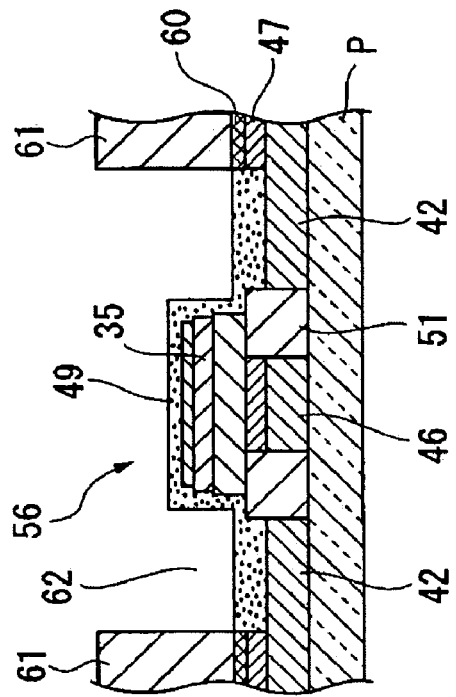
Figure 13A:
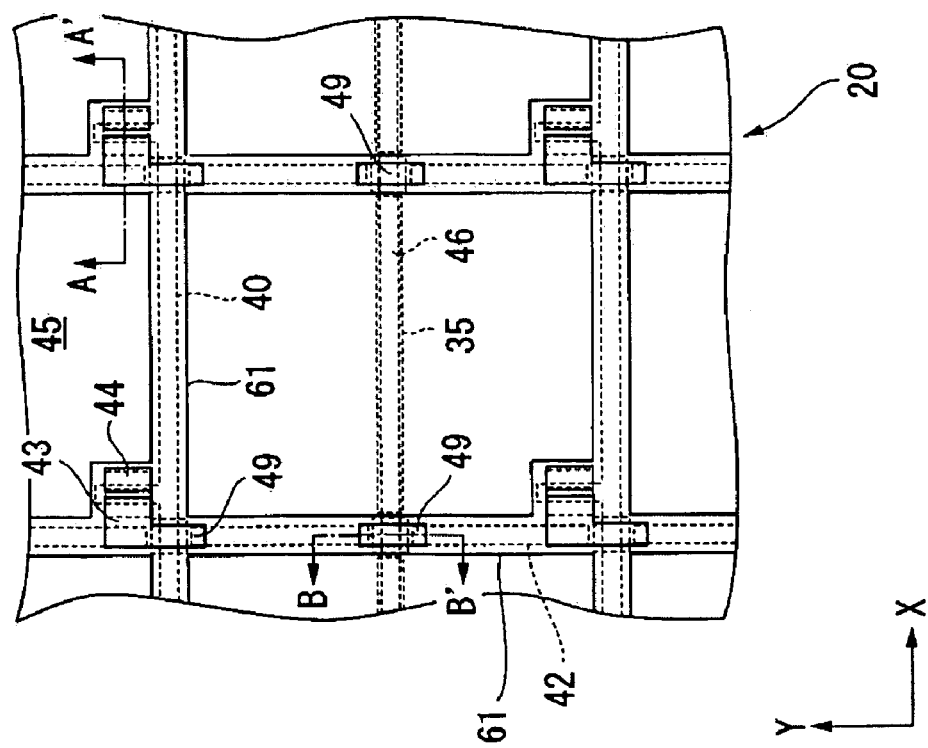
Figure 14B:
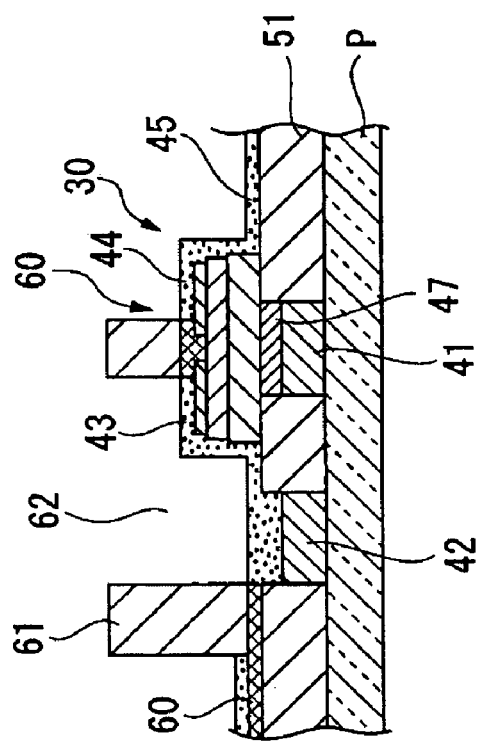
FIG. 14 is a diagram illustrating a procedure following FIG. 13.
Figure 14C:
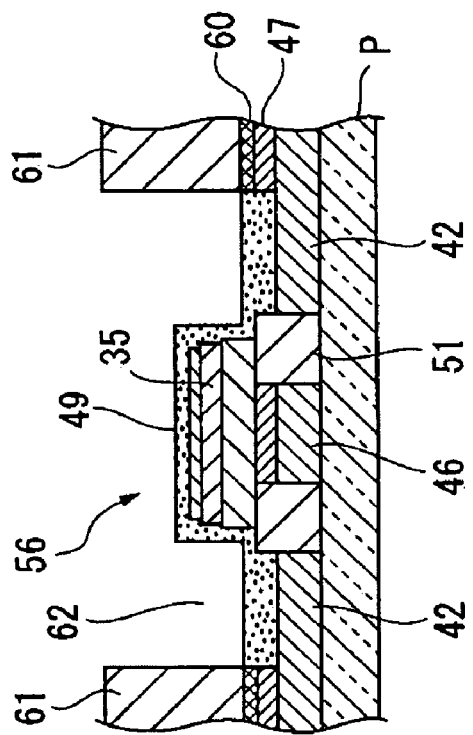
Figure 14A:
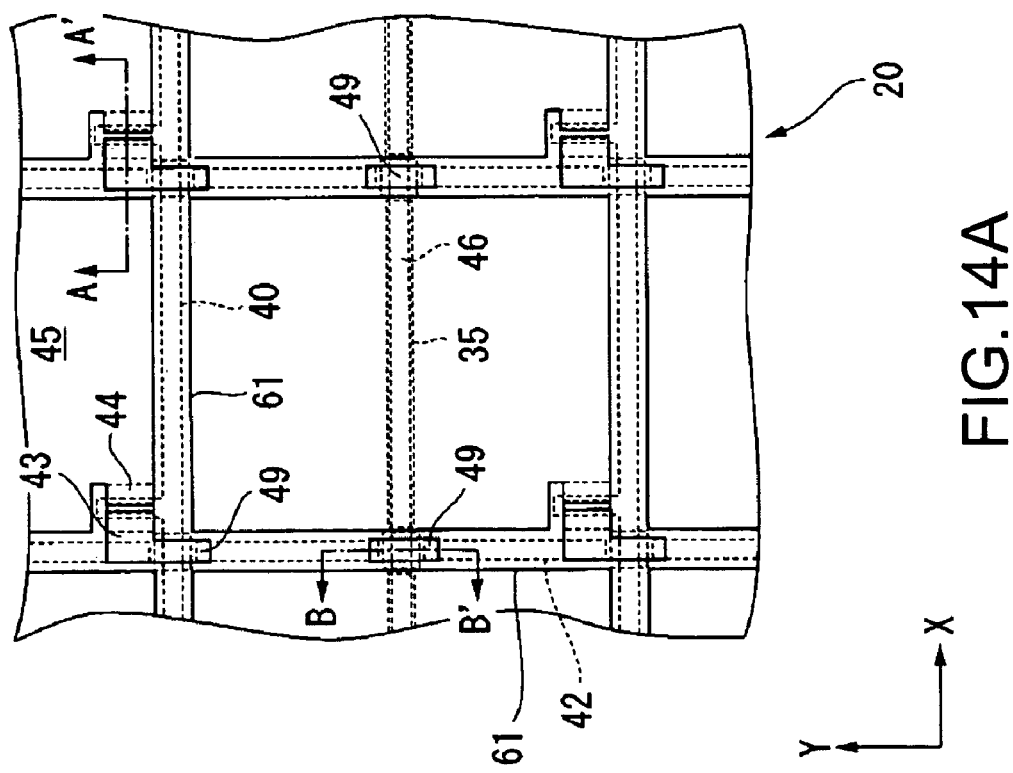

Consequently, the conductive layer 49 linking the source wirings 42 divided, source electrode 43, and drain electrode 44 are formed on the substrate P as shown in FIG. 13.

Then, a part positioned at the borderline of the pixel electrode 45 and drain electrode 44 in the bank 61 is removed by laser or the like. Pixel electrode ink containing an electrode material for the pixel electrode 45 is discharged and disposed in a region surrounded by the bank 61. The pixel electrode ink is a dispersion liquid in which a conductive fine particle such as ITO is dispersed. After discharging the pixel electrode ink to the substrate P, drying or firing process is carried out in order to remove the dispersion medium, if necessary. The drying or firing process secures an electrical contact between the conductive fine particles. As a result, the discharged ink is converted into a conductive film.

Consequently, the pixel electrode 45 conducted to the drain electrode 44 is formed on the substrate P as shown in FIG. 14.

The active matrix substrate 20 is manufactured by the processes described above.

In the embodiment, the process in which dry processes and photolithographic etching processes are combined can be reduced, since the active matrix substrate 20 is manufactured by the following three processes as described above: the first process in which wirings are formed on the substrate P in the lattice-shaped pattern; the second process in which the multilayered part 35 is formed; and the third process in which the pixel electrode 45, etc., are formed. That is, the gate wiring 40 and source wiring 42 are formed at one time, enabling the process in which dry processes and photolithographic etching processes are combined to be reduced.

In the third process, the process in which dry processes and photolithographic etching processes are combined can further be reduced since the bank 61 is formed by the droplet discharge method.

In addition, a drawback can be prevented in that a current flowed in the source wiring 42 flows into the multilayered part 35 on the capacitance wiring 46, since the multilayered part 35 (insulation film 31, active layer 32, and contact layer 33) formed on the capacitance wiring 46 is dividedly formed so as not to contact the multilayered part 35 formed on the intersection 56.

That is, in the layers included in the multilayered part 35, the contact layer 33 is the conductive film. The conductive layer 49 linking the source wirings 42 is formed on the multilayered part 35 (on the contact layer 33) formed on the intersection 56. Therefore, a current flowed in the source wiring 42 also flows into the contact layer 33. Accordingly, if the multilayered part 35 formed on the capacitance wiring 46 and the multilayered part 35 formed on the intersection 56 are touched, a phenomenon occurs in which a current flowed in the source wiring 42 flows into the multilayered part 35 on the capacitance wiring 46 as described above.

Alternatively, the active matrix substrate 20 of the invention avoids such drawback. As a result, a desired performance can be demonstrated.

In the embodiment, the structure is described in which the source wiring 42 is divided at intersection 56. However, the gate wiring 40 or capacitance wiring 46 also can be divided at the intersection 56. In a case where high display quality is required, the structure is preferably employed in which the source wiring 42 is divided since the capacitance wiring 46 has larger influence on the display than the source wiring 42.

In the embodiment, one preferred embodiment of the active matrix substrate is described. The shape or combination of structural elements is not limited to that according to the embodiment. For example, the shape and arrangement of the multilayered part 35 can be employed as shown in FIG. 15 instead of that shown in FIG. 9. In this case, the source region and the source wiring 42 are closely arranged. This arrangement allows an active matrix substrate having higher performance to be manufactured by reducing the area for forming the source electrode 43.

Electro-Optical Device

Next, a liquid crystal display 100 is described as an example of the electro-optical device using the active matrix substrate 20.

Figure 16:
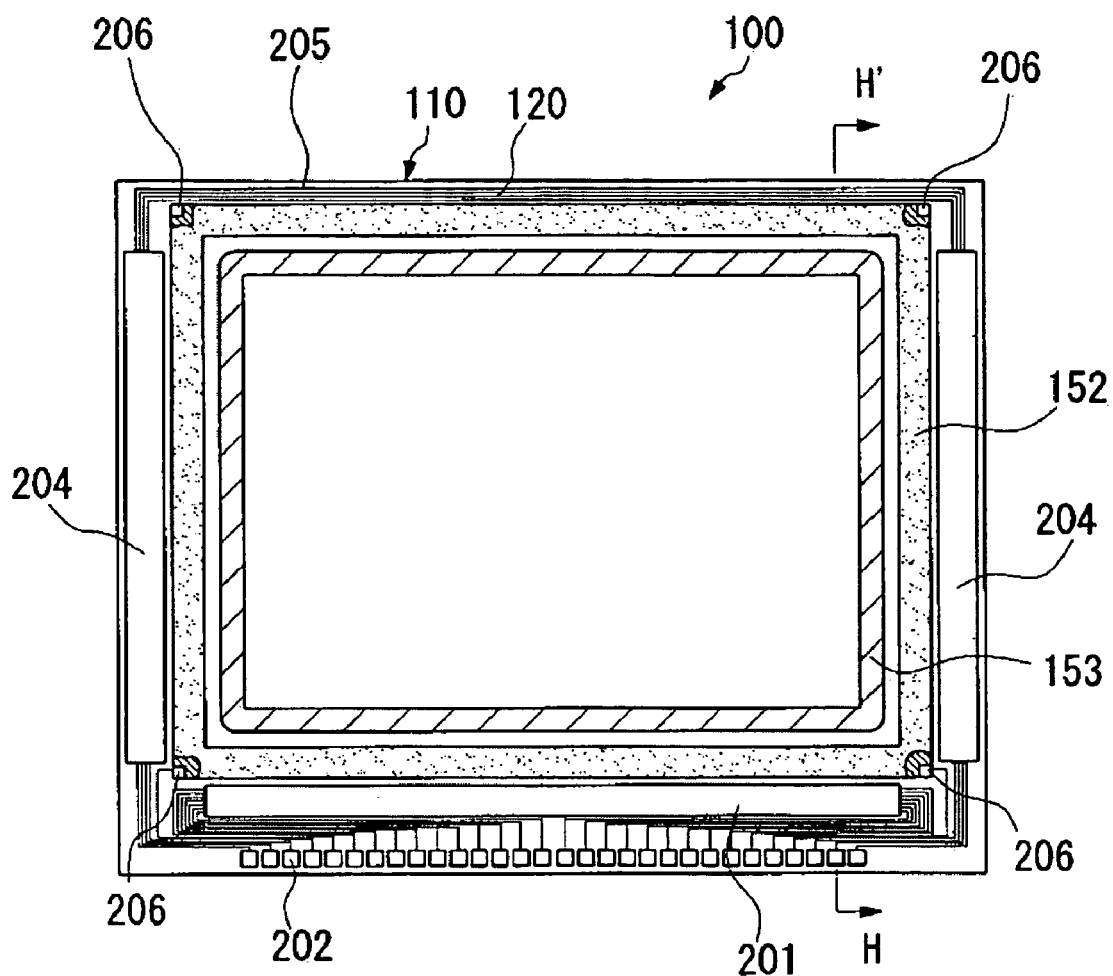
FIG. 16 is a plan view illustrating a liquid crystal display viewed from a counter substrate.
Figure 17:
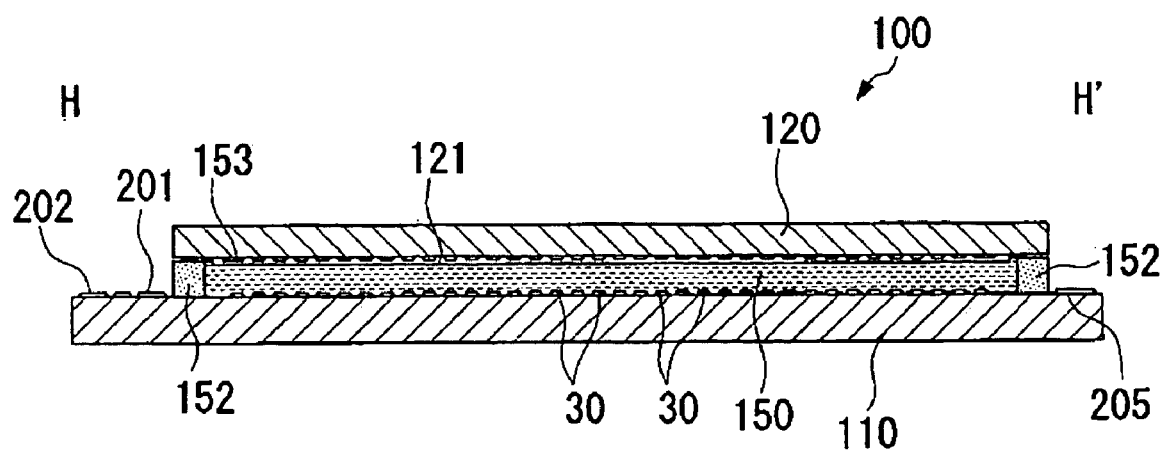
FIG. 17 is a cross-sectional view illustrating the liquid crystal display.

FIG. 16 is a plan view illustrating the liquid crystal display 100 viewed from the counter substrate. FIG. 17 is a cross-sectional view taken along line H-H' in FIG. 16.

It should be noted that in each drawing, a different scale is used for each layer and each part to present each layer and each part in recognizable size on the drawings.

In FIGS. 16 and 17, the liquid crystal display (electro-optical device) 100 includes a TFT array substrate 110 including the active matrix substrate 20, a counter substrate 120, both of which are bonded with a sealing member 152 composed of a photo curing sealing material, and a liquid crystal 150 sealed and kept in a region partitioned by the sealing member 152. The sealing member 152 is formed in a closed frame shape in a region inside the substrate, and is equipped with no liquid crystal injection inlet, resulting in no trace sealed with a sealing member being present.

A peripheral parting 153 made of a light shielding material is formed inside the region partitioned by the sealing member 152. In the outer region of the sealing member 152, a data line drive circuit 201 and a mounting terminal 202 are formed along one side of the TFT array substrate 110. A scan line drive circuit 204 is formed along each of two sides adjacent to the one side. The remaining one side of the TFT array substrate 110 includes a plurality of wirings 205 for connecting between the scan line drive circuits 204 provided on both sides of the image display region. At least one of the corner parts of the counter substrate 120 has an inter-substrate conducting member 206 to provide electrical conduction between the TFT array substrate 110 and the counter substrate 120.

Here, instead of forming the data line drive circuit 201 and scan line drive circuit 204 on the TFT array substrate 110, for example, a tape automated bonding (TAB) substrate on which a drive LSI is mounted and terminal groups formed on the peripheral part of the TFT array substrate 110 may be electrically and mechanically connected with an anisotropic conductive film.

In the liquid crystal display 100, a retardation film, a polarization plate, or the like is disposed at a predetermined direction depending on a type of the liquid crystal 150 to be used i.e. an operation mode such as twisted nematic (TN) mode, C-TN method, VA method, IPS mode, or the like, and normally white mode or normally black mode. The illustrations of them are omitted.

In a case where the liquid crystal display 100 is structured for displaying colors, for example, color filters of red (R), green (G), and blue (B) are formed with their protective films on a region opposing to each pixel electrode, which will be described later, of the TFT array substrate 110 in the counter substrate 120.

The liquid crystal display 100 can display a high quality image since the active matrix substrate 20 is manufactured by the above-described processes.

In the embodiment, while the method for forming a film pattern of the invention is applied to the method for forming the wiring structure of the liquid crystal display, but the invention is not limited to this. For example, the invention also can be applied to a case where a color filter is formed on the active matrix substrate or counter substrate.

The active matrix substrate also can be applied to electro-optical devices other than liquid crystal displays, for example, organic electroluminescent (EL) displays or the like. The organic EL display is an element, which includes a thin film containing a cathode, an anode, and an inorganic or organic compound having fluorescence sandwiched between the cathode and anode, emits light by the following manner: electrons and holes are injected into the thin film so as to be excited for generating exciters (excitons); and then, light (fluorescence or phosphorescence) is emitted when the excitons are re-combined. A self light emitting full-color EL device can be manufactured by patterning with ink of an light emitting layer forming material, and a hole injection/electron transport layer. The light emitting layer forming material is the material displays each light emission color of red, green and blue and chosen from the fluorescent materials used for organic EL elements. Such organic EL device is included in the electro-optical device of the invention. In the organic EL display, the method for forming a film pattern of the invention also can be applied to the method for forming a hole injection/transport layer forming material, the light emitting layer forming material, or the like.

Moreover, the active matrix substrate 20 can be applied to a surface conduction type electron emission element, which utilizes a phenomenon in which electrons are emitted when a current flows in parallel with the surface of a thin film that has a small area and formed on a plasma display (PDP) or a substrate.

Electronic Apparatus

Next, examples of an electronic apparatus of the invention will be explained.

Figure 18A:
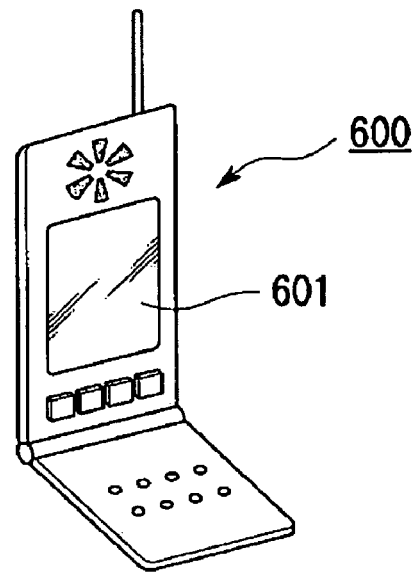
FIG. 18 shows examples of an electronic apparatus.

FIG. 18A is a perspective view illustrating an example of cellular phones. In FIG. 18A, a cellular phone 600 includes a display 601 equipped with the liquid crystal display 100 of the above-described embodiment.

Figure 18B:
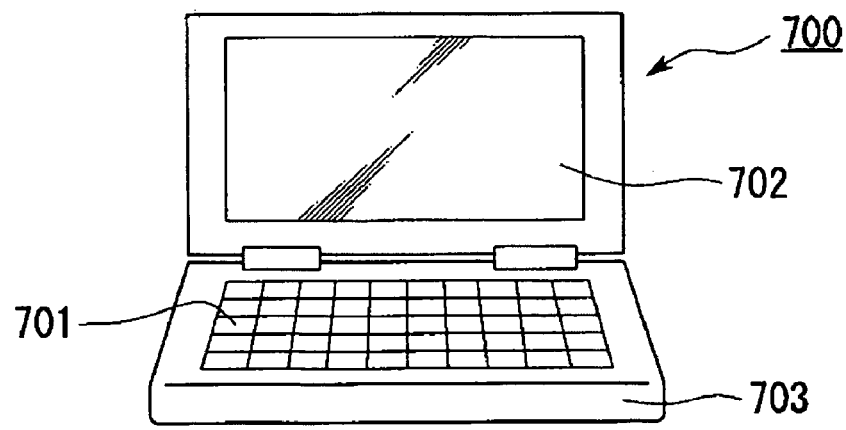

FIG. 18B is a perspective view illustrating an example of portable information processors such as word processors and personal computers. In FIG. 18B, a portable information processor 700 includes an input part 701 such as a key board, an information processor body 703, and a display 702 equipped with the liquid crystal display 100 of the above-described embodiment.

Figure 18C:
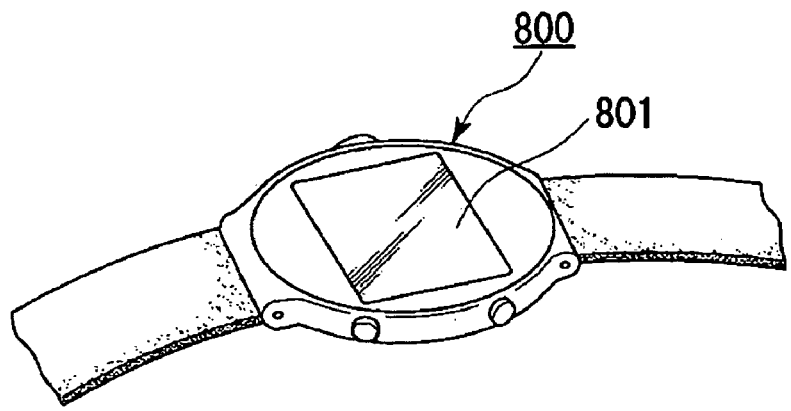
Figure 19:
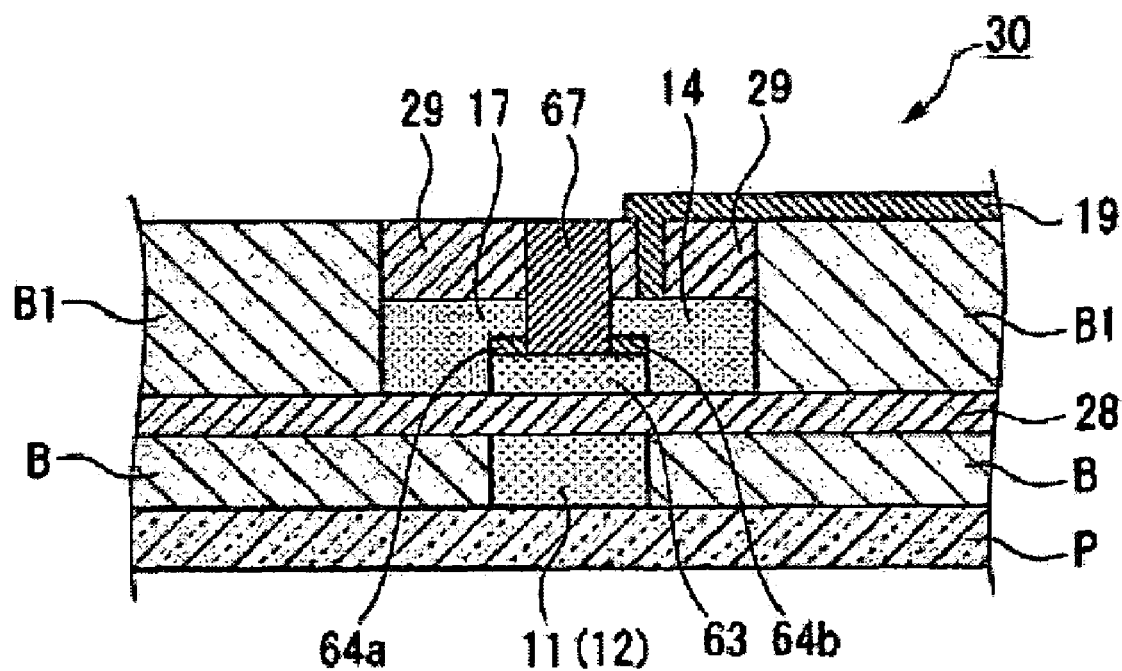
FIG. 19 shows an example of a lower substrate according to the prior art.

FIG. 18C is a perspective view illustrating an example of wristwatch type electronic apparatuses. In FIG. 18C, a wristwatch 800 includes a display 801 equipped with the liquid crystal display 100 of the above-described embodiment.

The electronic apparatuses shown in FIGS. 18A to 18C have high quality and performance since the liquid crystal display 100 of the above-described embodiment is included.

In addition, the embodiment can be applied to a large sized liquid crystal panel such as televisions or monitors.

While the electronic apparatus of the embodiment is equipped with the liquid crystal display 100, but the electronic apparatus can be employed that is equipped with other electro-optical devices such as organic electroluminescent displays, plasma displays, or the like.

Although as described above, the preferred embodiment of the invention is described referring to the attached drawings, needless to say, the invention is not limited to these examples. In the above-described examples, the shapes, the combinations or the like of the each described components are an example, and various modifications can be made based on design demand or the like within the scope not departing from the gist of the invention.

What is claimed is:

1. The method for manufacturing an active matrix, comprising:
forming a wiring on a substrate in a lattice-shaped pattern, wherein the wiring includes:
a first direction wiring; and
a second direction wiring, wherein the second direction wiring is divided by the first direction wiring;
forming a multilayered part on the first direction wiring, the multilayered part comprising an insulation film and a semiconductor film; and
forming a conductive layer on the multilayered part so as to electrically link the divided second direction wirings, and a pixel electrode electrically connected to the second direction wiring via the semiconductor film, wherein forming the conductive layer and the pixel electrode includes:
forming a bank partitioning the conductive layer and the pixel electrode by a droplet discharge method; and
disposing a functional liquid containing a conductive material to a region partitioned by the bank.

2. The method for manufacturing an active matrix substrate according to claim 1, wherein the wiring includes:
a source wiring;
a gate wiring; and
a capacitance wiring extending almost straight along the gate wiring, the source wiring being divided by the gate wiring or the capacitance wiring.

3. The method for manufacturing an active matrix substrate according to claim 1, the wiring being manufactured by a droplet discharge method.

4. The method for manufacturing an active matrix substrate according to claim 1, wherein forming the multilayered part includes forming the multilayered part on the capacitance wiring, the multilayered part being divided at the intersection on the capacitance wiring.

5. The method for manufacturing an active matrix substrate according to claim 1, wherein forming the multilayered part includes performing a half exposure process to the semiconductor film so as to form a switching element.

6. The method for manufacturing an active matrix substrate according to claim 1, the bank being formed with a material having lyophobicity.

7. The method for manufacturing an active matrix substrate according to claim 1, the material containing an inorganic material.

8. An active matrix substrate manufactured by using the method for manufacturing an active matrix substrate according to claim 1.

9. An electro-optical device equipped with the active matrix substrate according to claim 8.

10. An electronic apparatus equipped with the electro-optical device according to claim 9.

* * * * *